United States Patent [19]
Kammersqard et al.

[11] Patent Number: 5,505,533
[45] Date of Patent: Apr. 9, 1996

[54] RACKMOUNT FOR COMPUTER AND MASS STORAGE ENCLOSURE

[75] Inventors: Dana W. Kammersqard, Vista; Angus R. Colson, Jr., Jamul; Steven B. Cook, Vista, all of Calif.

[73] Assignee: Artecon, Carlsbad, Calif.

[21] Appl. No.: 265,208

[22] Filed: Jun. 24, 1994

Related U.S. Application Data

[63] Continuation-in-part of Ser. No. 179,082, Jan. 10, 1994.

[51] Int. Cl.$^6$ ................................................. A47B 77/00
[52] U.S. Cl. ............................................................ 312/236
[58] Field of Search .................................. 312/107, 111, 312/257.1, 236, 323.3; 361/683, 687, 725, 730

[56] References Cited

U.S. PATENT DOCUMENTS

| | | | |
|---|---|---|---|
| 3,413,050 | 11/1968 | Sommers et al. | 312/107 |
| 4,123,129 | 10/1978 | Butler | 312/111 X |
| 4,201,428 | 5/1980 | Johnson | 3/312 |
| 4,433,881 | 2/1984 | Witten et al. | 312/111 X |
| 4,991,912 | 2/1991 | Fox | 312/236 |
| 5,101,320 | 3/1992 | Bhargava et al. | 361/694 X |
| 5,193,050 | 3/1993 | Dimmick et al. | 361/694 |
| 5,218,514 | 6/1993 | Huynh et al. | 361/687 X |
| 5,240,320 | 8/1993 | Yerman | 312/236 X |
| 5,274,530 | 12/1993 | Anderson | 361/694 X |
| 5,287,244 | 2/1994 | Hileman et al. | 361/687 |
| 5,311,397 | 5/1994 | Harshberger et al. | 361/683 |

Primary Examiner—Peter M. Cuomo
Assistant Examiner—Robert J. Sandy
Attorney, Agent, or Firm—John J. Murphey; Murphey Law Offices

[57] ABSTRACT

A chassis for encapsulating a standard desk-top mounted electronic computer for juxtaposed mating with computer accessories in a EIA-configured rack including a base plate defined by spaced-apart side walls and spaced-apart front and rear walls, the walls extending upward therefrom to a common contiguous upper edge enclosed by a top plate to create of EIA-sized enclosure, a support plate bounded by the walls and located intermediate between the base plate and the top plate to divide the enclosure into a lower bay and a separate upper bay, the upper bay of a size and shape to encapsulate the computer therein and the lower bay of a size to receive a power supply for the computer and other accessories for interfacing with the computer, a ram air cooling device in the air thereinto for cooling the accessories and power supply and for providing a separate stream of cooling air from the lower bay to the upper bay to cool the computer encapsulated therein and provide additional air for use by the computer's internal cooling system, rails mounted on the side walls for supporting the frame in the rack, and handles mounted on the side walls for lifting the frame.

33 Claims, 22 Drawing Sheets

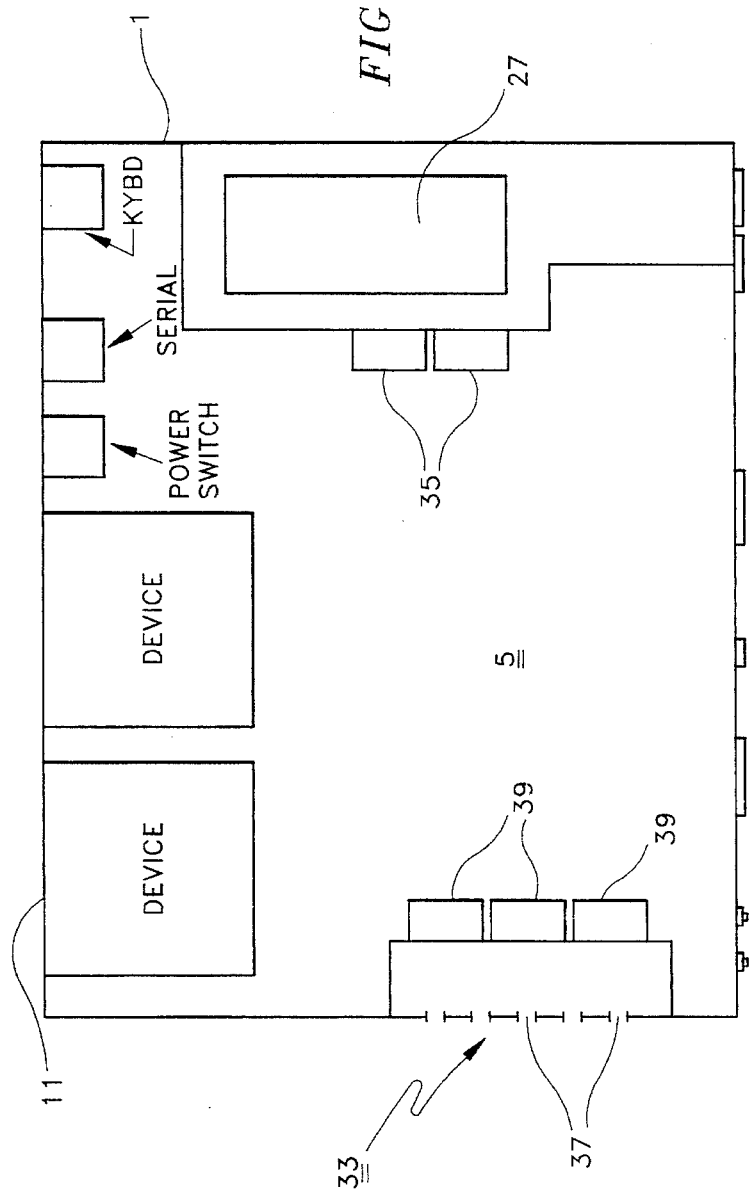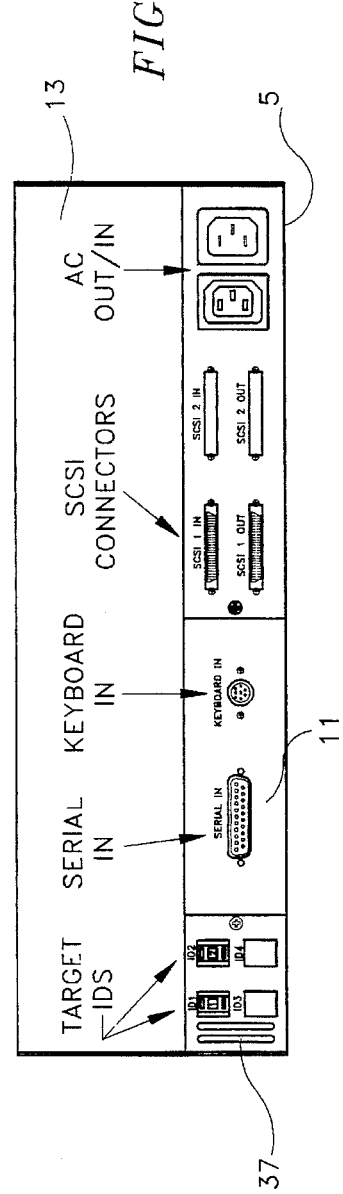

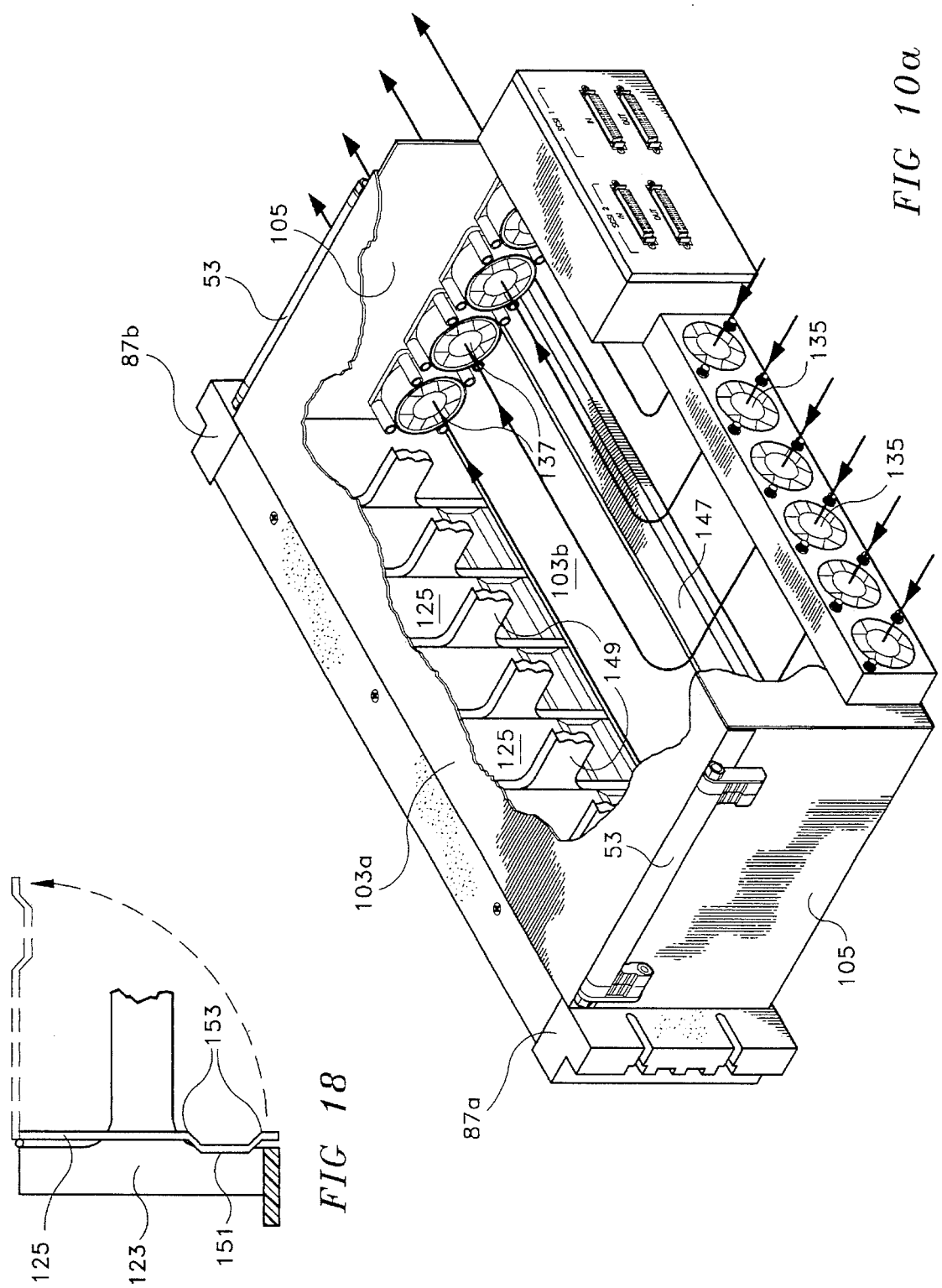

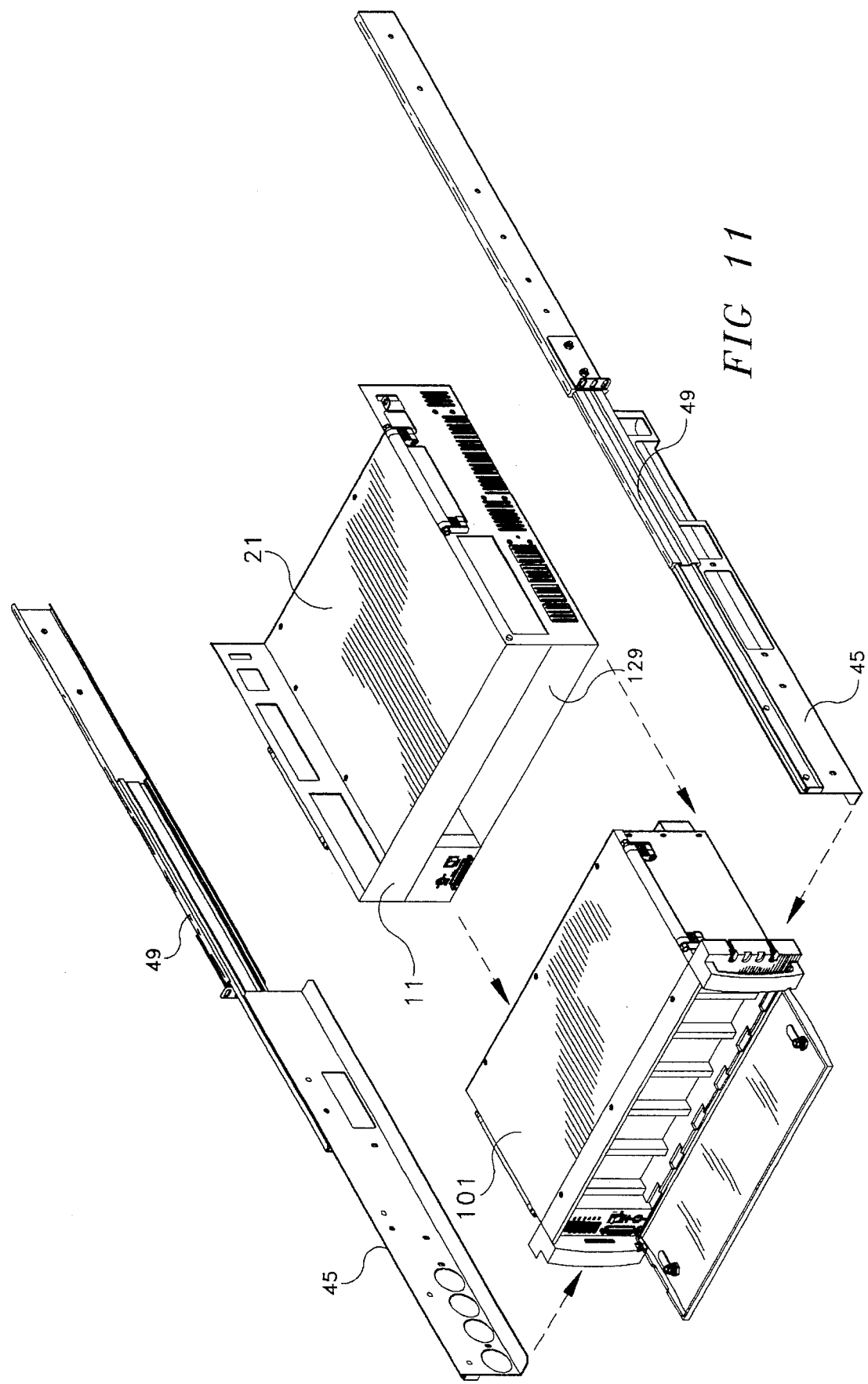

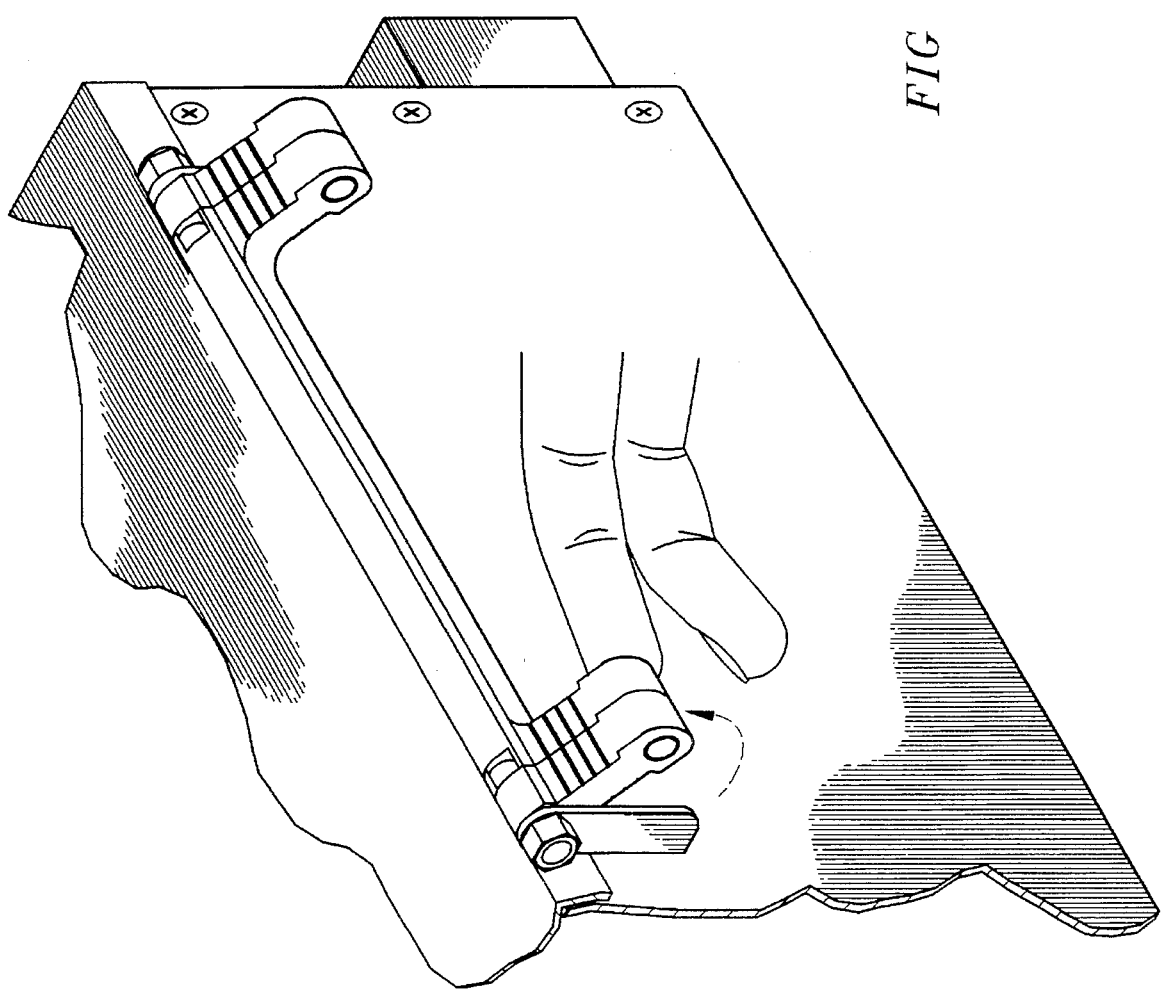

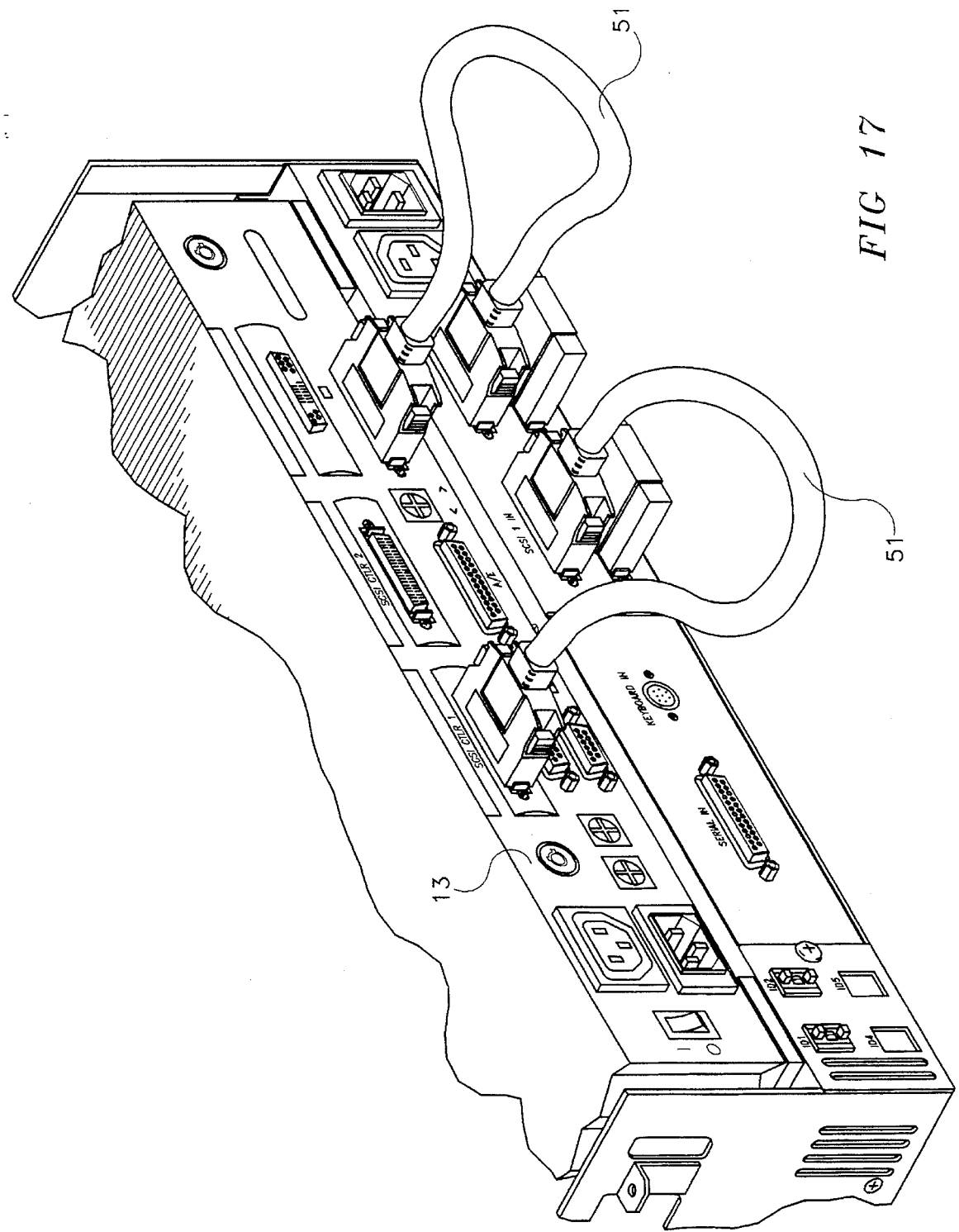

RACKMOUNT FOR COMPUTER AND MASS STORAGE ENCLOSURE

RELATED TO OTHER APPLICATIONS

This application is a continuation-in-part of our previous patent application, Ser. No. 08/179,082, filed Jan. 10, 1994, titled SELF-CAPTURING ARTICULATING CHEST HANDLE.

BACKGROUND OF THE INVENTION

1. Field of the Invention

This invention pertains to the field of mounting hardware. More particularly, it pertains to a means of configuring personal electronic computers, i.e., "PCs", desk-top PCs and work stations of all types, so that they are capable of performing a wider range of functions and/or a more intense series of computer transactions.

2. Description of the Prior Art

PCs are fully integrated into virtually all walks of life. There are probably few households that do not have either a PC in the house or one readily accessible nearby. Terms such as "chips", "ROM" and "megabyte" are as familiar to most as "mother" and "apple pie".

The most familiar type of PC is the "desk top" model. These units are usually used alone. They have one, and often two, disk-drive units integral with the processor as well as a keyboard and a display monitor. When more accessories, such as more disk drives, tape drives, DAT units, floppy drives and CD Roms are desired, they are placed close by the central processor and connected thereto by electrical cables through SCSI (pronounced "scuzzy") connectors. SCSI stands for Small Computer System Interface and includes multipin serial and parallel male and female connectors.

In laboratories, research offices and the like, it is common to interconnect numerous accessories with a computer to obtain maximum benefit of the computer functions. It is not uncommon to see four to eight disk drives, two to three CD Roms, and numerous other devices interconnected to a single processor in order to carry out complex calculations that are inimitable to research and development-type endeavors. This complexing of accessories causes two distinct problems that have not been solved by the prior art and that remain obstacles to wider use of PCs in R & D-type work.

The first problem is that the individual accessories, as well as the computer processing unit (CPU), are electrically driven and generate substantial amounts of heat energy when operated at high duty cycles. This heat generation is not very severe in most family or office uses of the units and the small internal fans supplied with the units are usually sufficient to cool the devices to within a normal operating range. However, as more disk drives are added and the CPU instructed to poll them frequently, and when the CPU is caused to perform enhanced computations, the heat generated is often not sufficiently dissipated rapidly enough with the result that overheat protective processes are caused to initiate. Activation of these processes often cause slow-downs or termination of computations. When these processes are bypassed, it is not uncommon for some units to fail causing the computation to crash, aborting the intended research.

A second problem is that of numbers. As the number of computer accessories rises, the volume occupied by them and their attendant cabling and interconnecting begin to expand seemingly exponentially with the result that the computer network becomes a mish-mash of units interspersed with a spaghetti-like array of twisted wires. This leads to inaccuracies in the computations and frustration in the operators. Where this interconnection problem is left unchecked, the heating problem often arises, bringing about its own problems.

The prior art has done little to solve these problems. The builders of computers strive constantly to make the computer more sleek and aesthetically desirable. Sleekness leads to reduced silhouettes and thinner profiles which leads to more difficulty in providing sufficient air passageways to keep the unit cooled. This teaches away from providing more cooling. In addition, computer manufacturers continue to locate the keyboard interface connection and the off/on power switch at the rear of the unit thereby requiring an area to be set aside about the unit, to reach behind it, to turn the unit on and off, while at the same time requiring longer cables to interconnect the front-mounted keyboard with the rear-mounted plug. None of these designs are useful in solving the heating and complexing problems heretofore described.

Computer manufacturers are moving towards faster processing chips with more bytes per operation. This is an extremely beneficial approach to those who wish to use these PCs for more complex tasks. However, with sleekness in design remaining high on the agenda and rigid rules on location of certain items, the modern computer is not being used to its fullest potential.

SUMMARY OF THE INVENTION

This invention is a means to solve the two problems hereinbefore set forth. It is a unique concept of adapting a personal computer to a configuration where it can be utilized to a greater potential. The configuration involves a chassis rack wherein a standard PC may be encapsulated and which contains a novel supplemental air cooling system to maintain the PC at a cool running temperature, while at the same time providing access to all of its operations. The chassis is sized and designed to fit into a standard EIA (Electronic Industries Association) configuration. These are conventionally found and used in research and development operations and generally comprise a series of racks stacked one atop the other, which use roller slides to hold instruments in stacked arrangement and yet allow each unit to be moved out of alignment for replacement, servicing and/or modification.

This invention also includes a unique air-cooling system that provides enhanced cooling to the CPU and its components. The system routes air through definite passageways and over certain components and through apertures in the chassis to provide the cooling. The air is rammed through at high speed to keep the units cool while they are performing these enhanced transactions.

Another aspect of the invention is a unique fascia door panel that fits over the front of the chassis to provide a measure of aesthetic dressing yet includes a small panel containing the system off/on switch, the keyboard cable connection port, and other switches and connectors, remoted from their traditional locations at the rear of the computer, for more efficient access by the operator. The door is openable and removable at the option of the user.

Still another feature of this invention is a unique mass storage enclosure that may be used as a stand-alone unit, but preferably attachable to the front wall of the chassis and electronically interconnected to the computer encapsulated in the chassis. This unique device may be charged with a plurality of drives, such as disk drives and DATs, with no external cabling, so that the computer may be loaded with additional information upon which computer operations are to be performed. These drives may be in number such as one through six, for instance, and are conveniently and closely packed so that the overall unit retains a compact profile. A unique cooling system is built into this enclosure that insures adequate cooling of the drives, no matter if one or the full charge of, for instance, six drives is inserted. The unique cooling system is preferably pressurized to increase cooling rates and insure full flow of cooling throughout the full interior of the equipment.

The invention comprises a chassis for encapsulating a standard desk-top mounted electronic computer for juxtaposed mating with computer accessories in a EIA-configured rack comprising a base plate defined by spaced-apart side walls and spaced-apart front and rear walls, the walls extending upward therefrom to a common contiguous upper edge enclosed by a top plate to create of EIA-sized enclosure; a support plate bounded by the walls and located intermediate between the base plate and the top plate to divide the enclosure into a lower bay and a separate upper bay, the upper bay of a size and shape to encapsulate the computer therein and the lower bay of a size to receive a power supply for the computer and other accessories for interfacing with the computer; ram air cooling means in the air thereinto for cooling the accessories and power supply and for providing a separate stream of cooling air from the lower bay to the upper bay to cool the computer encapsulated therein and provide additional air for use by the computer's internal cooling system; rails mounted on the side walls for supporting the frame in the rack; and, handles mounted on the side walls for lifting the frame.

Accordingly, the main object of this invention is a chassis for adopting a standard desk-top mounted electronic computer for juxtaposed mating with computer accessories in a EIA-configured rack. Other objects include a means of loading the computer with extra drives, to maximize its operations and simultaneously cool the components to retain them within their operative temperature range; a method of relieving the user of a computer from the problem of having numerous accessories interconnected with numerous wires to provide a cleaner and more tolerable work place.

Still other objects of the invention include a practical means of increasing the duty of a standard desk-top mounted computer, so that it performs greater tasks, without moving to a larger computer, by providing extra cooling in a unique pattern inside the chassis to retain the components in an operative temperature range; a means of using a standard computer at an enhanced level of operation to achieve maximum operativeness at minimum cost; and, a means of efficiently interconnecting various computer accessories to a central processing unit.

These and other objects of the invention may be determined by reading the following description of the preferred embodiment taken together with the drawings appended hereto. The protection sought by the inventors may be gleaned from a fair reading of the claims that conclude this specification.

DESCRIPTION OF THE DRAWINGS

FIG. 2a is a block diagram top view of the lower bay of the chassis showing a typical arrangement of accessories and components located therein, and FIG. 2b is a view of the lower bay rear wall;

FIG. 10a is an illustrative view, partially cut away, of the general flow of cooling air through the enclosure;

FIG. 11 is a view of the mass storage enclosure posed for assembly against the front wall of the chassis for use in the EIA rack;

FIGS. 16a–16d are diagrams showing the self-capturing articulating chest-type handles attached to the sides of the chassis and to the sides of the mass storage enclosure are unfolded (and folded) from storage, for use, e.g., FIG. 16a shows the handle in closed/locked position; FIG. 16b shows the handle and links rotated outward 45°; FIG. 16c shows the handle and links rotated outward 90°; and, FIG. 16d shows the handle in an open/unlocked position;

FIG. 17 is an illustrative view of the typical SCSI interconnection between the computer and the chassis lower bay, rear wall connections; and, FIG. 18 is a side view of a door of the enclosure in its closed and open positions.

DESCRIPTION OF THE PREFERRED EMBODIMENTS

Figure 1:
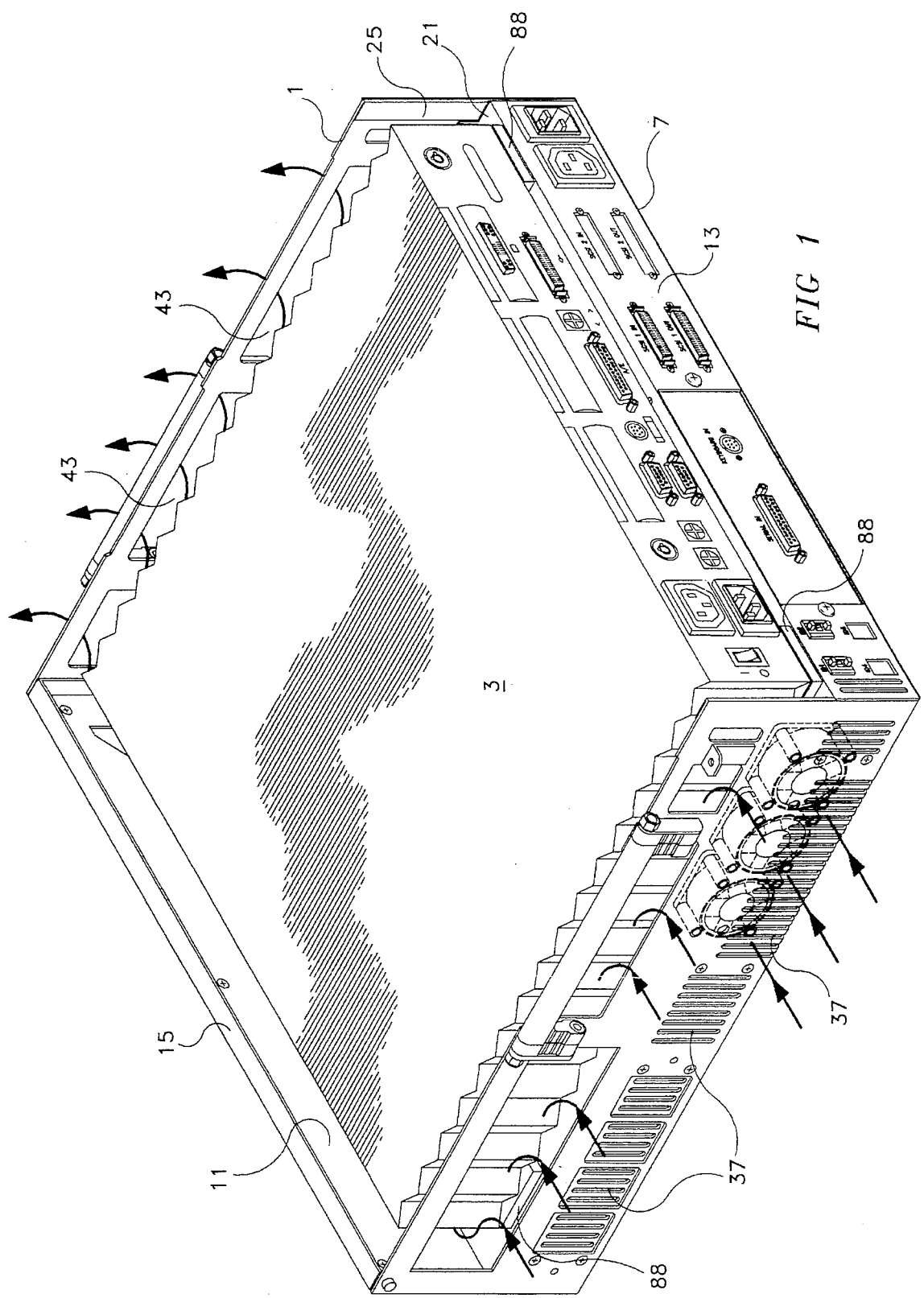
FIG. 1 is an illustrative view of the chassis of this invention with a typical desk-top mounted computer encapsulated therein and the typical flow of air forced therethrough for cooling the computer.

Turning now to the drawings, where like numbers identify like elements throughout the twenty-three figures, FIGS. 1 through 5 show a chassis or rack 1, for encapsulating a standard desk-top electronic computer 3, such as a SPARC® from Sun Computer Co., Inc., and shows chassis 1 to comprise a base plate 5, preferably flat and of square dimensions, that is defined about its peripheral edges 7 by a pair of spaced-apart side walls 9 and spaced-apart front and rear walls 11 and 13 respectively. Side walls 9 and front and rear walls 11 and 13 interconnect along their respective corner edges and extend upward to a contiguous upper edge 15 covered over by a top plate 17. A support plate 21 is mounted inside said walls, intermediate base plate 5 and top plate 17 to divide the interior of rack 1 into a lower bay 23 and an upper bay 25. Upper bay 25 is designed to be of a size for encapsulating computer 3 within the volume defined by base plate 5, top plate 17, side walls 9 and front and rear walls 11 and 13 respectively.

Said plates, including base plate 5, and said walls are preferably made of metal and are flat and smooth, so that they provide shielding of the computer in upper bay 25 and the accessories in lower bay 23 from radiation sourced outside thereof and vice versa. The plates and walls may be conveniently stamped from one sheet of metal and bent into final shape or made from separate pieces of metal plate welded or riveted together. Rear wall 13 is preferably made in two half pieces split laterally across the rear of rack 1 at the level of support plate 21. The exterior dimensions of rack 1 are preferably set to EIA standards such as 5¼ inches tall, 17 inches wide and 17 inches deep. The inventors apply the term "SRU" to rack 1 which stands for "SPARC® RACK-MOUNT UNIT".

FIG. 2a shows a typical layout of lower bay 23 and shows a power supply 27 for providing electrical power to computer 3 and the accessories interfaced therewith, and a ram air cooling means 33 to provide cooling of the components. As mentioned earlier, most typical desk-top PCs are capable of more computer transactions than they are normally used for, with the main impediment to extended use being the inability to efficiently interconnect more accessories and the inefficient cooling of the components brought on by desires to produce a trim, compact unit. Ram air cooling is extremely important because it maintains the computer and other components at safe operating temperatures while they are under increased load.

Figure 4:
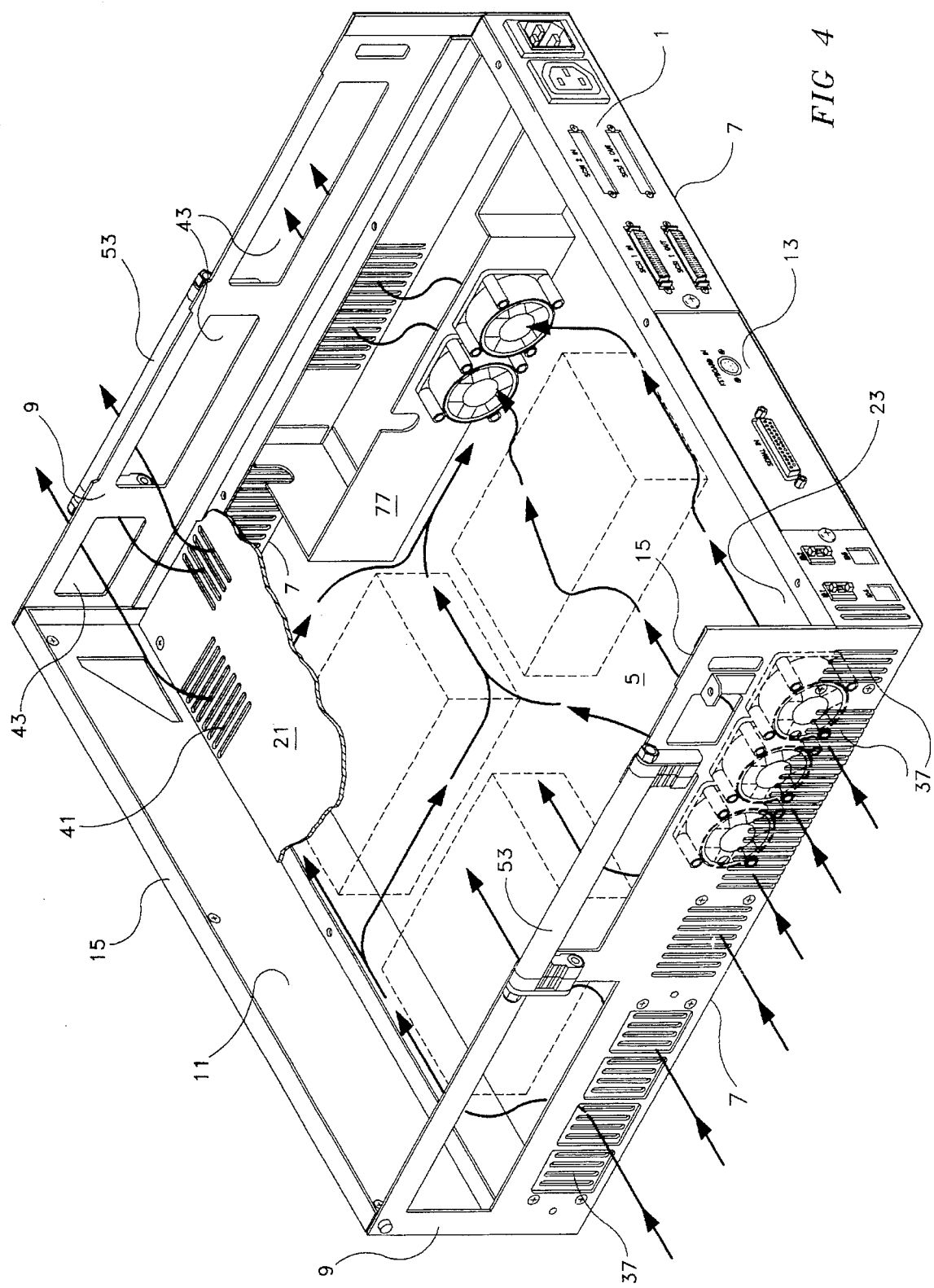
FIG. 4 is a flow diagram of the cooling air pattern through the lower bay.

Means 33 includes at least one, but preferably a plurality of powerful cooling air fans 35 located near power supply 27 to draw air in through a plurality of inlet apertures or slots 37 formed in said walls of lower bay 23, across power supply 27 and out exhaust apertures formed in side wall 9. The location of air fans 35 is shown in FIG. 2a and the air flow pattern is generally shown in FIG. 4.

Lower bay 23 defines a volume sufficient in size and shape to hold a plurality of computer accessories including CD Roms, DAT units and disk drives. They may be arranged as shown in FIG. 2a with their front access faces adjacent front wall 11 so that disks may be inserted and withdrawn through a slot or slots (not shown) formed in the lower portion of front wall 11. In other configurations, these accessory drives may be mounted over full size openings (not shown) formed in the lower portion of front wall 11.

Means 33 also includes a plurality of additional ram air cooling fans 39, preferably mounted in lower bay 23 inside a series of inlet slots 41 formed in side walls 9 and front and rear walls 11 and 13. Fans 39 draw more air in through slots 37 and passes it into upper bay 25, through openings (not shown) formed in support plate 21. This flow of air is passed around the computer encapsulated in upper bay and, as shown in FIG. 1, augments the air flow through computer 3 (by its own internal cooling fan) and exhausts through slots 43 formed in upper bay side walls 9. The importance of providing extra cooling to the computer encapsulated in upper bay 25 and to accessories in lower bay 23 interfaced therewith cannot be overstated. Without this active, ram air cooling the SRU cannot be maintained at a workable temperature for the enhanced computer processes available under this invention.

Figure 7:
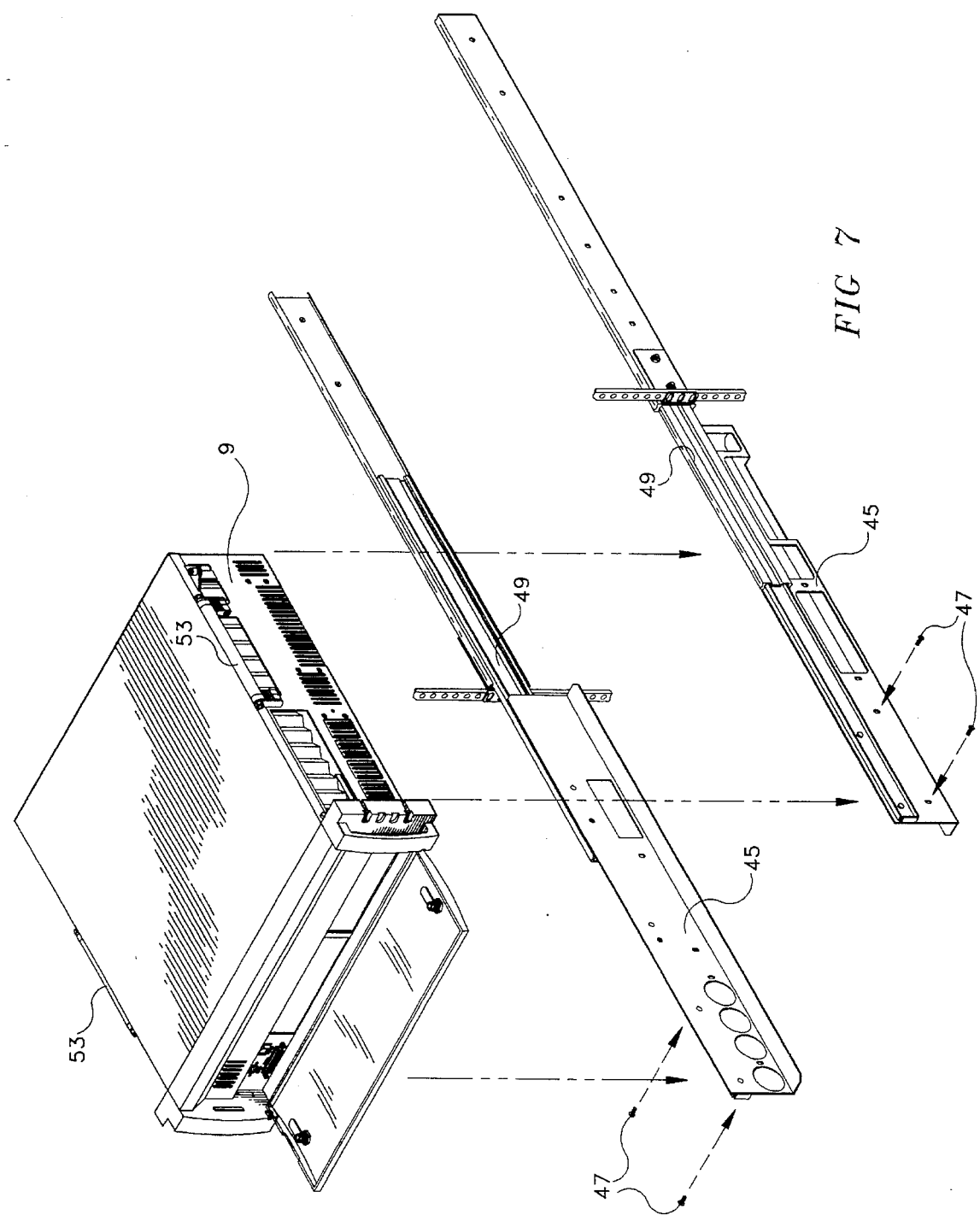
FIG. 7 is an illustrative view of the chassis with a front fascia door assembled in a EIA rack.
Figure 8:
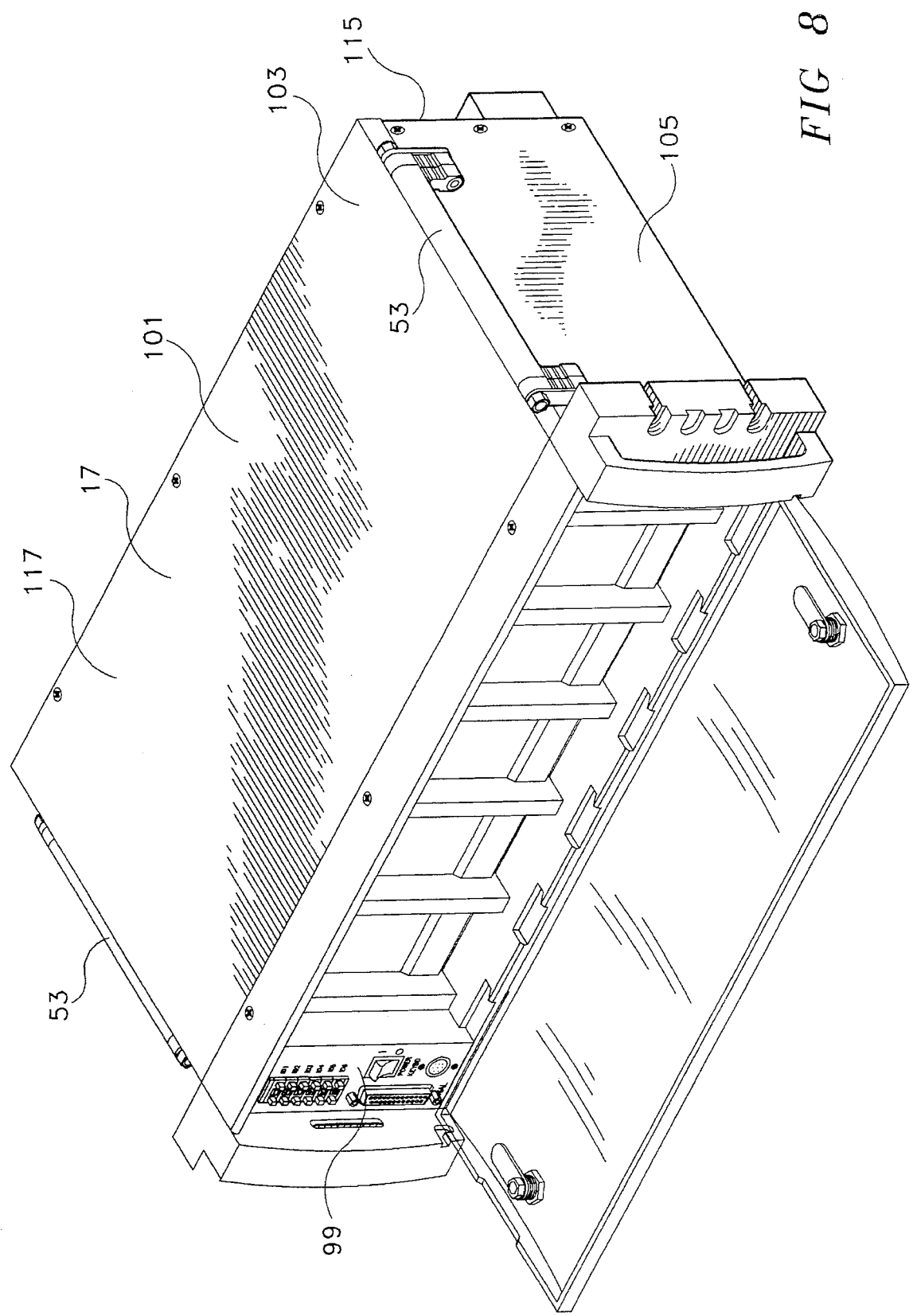
FIG. 8 is an illustrative view of the mass storage enclosure of this invention with a front-mounted fascia door.

As shown in FIG. 7, a pair of "L" shaped brackets 45 are conveniently attached by machine screws 47 to side walls 9 and these are, in turn, attached by screws to a pair of roller-type slide rails 49 that are slidingly mounted in a EIA type enclosure. In this configuration, the desk-top mounted computer 3 is transformed into a rack-mounted arrangement with accessories, such as additional disk drives and separate power supply, conveniently mounted adjacent thereto. As shown in FIG. 17, typical SCSI connectors are provided at rack rear wall 13 for interconnecting the accessories mounted in lower bay 23 with computer 3 in upper bay 25 through short cables 51 thereby reducing the potential for signal loss and signal transfer delay, as is experienced with longer interconnecting cables, and reducing the clutter normally encountered when interconnecting computer components on a common work surface such as a desk.

Figure 5:
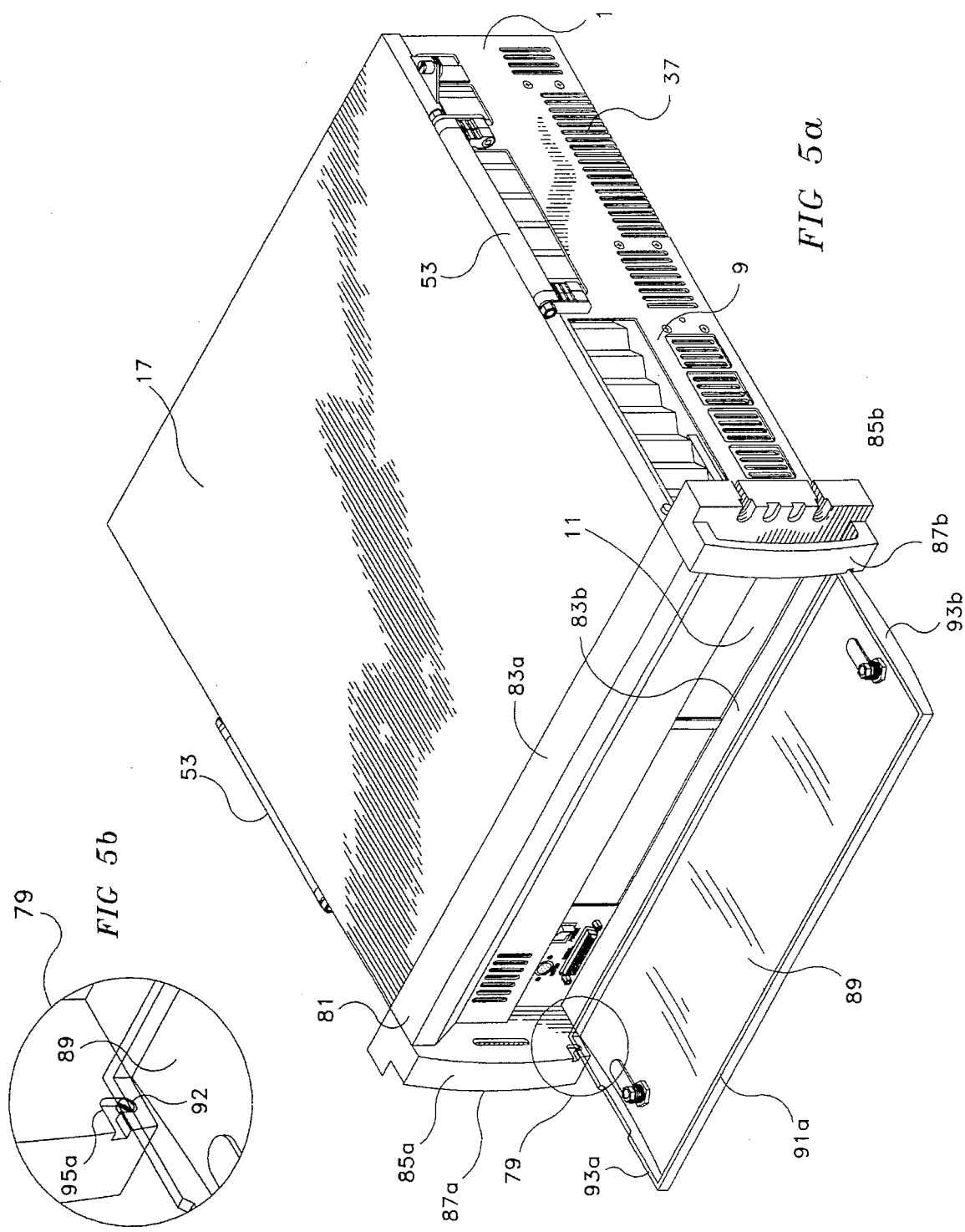
FIG. 5 is an illustrative view of the front fascia door mounted over the front wall of the chassis.

A pair or pairs of unique handles 53 are attached outboard of rack side walls 9 to conveniently lift the unit onto and off of brackets 45 for later movement by rails 49. The typical placement of handles 53 are shown in FIGS. 5 and 7. The preferred embodiment of handles 53 are of the self-capturing articulating chest-type configuration as is more specifically disclosed and claimed in our co-pending patent application referred to at the beginning of this specification. The handles comprise a handle bar 55 of terminal length containing a hand-grasping portion 57, a pair of legs 59a and 59b extending downward from the terminal ends of bar 55, a pair of links 61a and 61b defined by spaced-apart, first and second ends 63 and 65, pivotally attached at said first ends to the terminal ends of said legs, outboard thereof, to allow handle 55 to be swung thereabout. A bracket 67 is provided for mounting against vertical side wall 9 that includes a pair of mutually spaced-apart ears 69a and 69b extending outward therefrom. A first means 71 is also provided for pivotally interconnecting second link ends 65 to ears 69a and 69b and including an extended element 73 located inboard from the connection interior of links 61a and 61b. A second means 75 is formed in handle bar 55 for fastenable receipt therein of extended element 73 when handle 53 is swung downward from a carrying position and rotated about links 61a and 61b into overlapping engagement therewith and folded legs 59a and 59b and folded links 61a and 61b swung further downward against side wall 9. This process is depicted in stages in FIGS. 16a, 16b, 16c and 16d.

Figure 3:
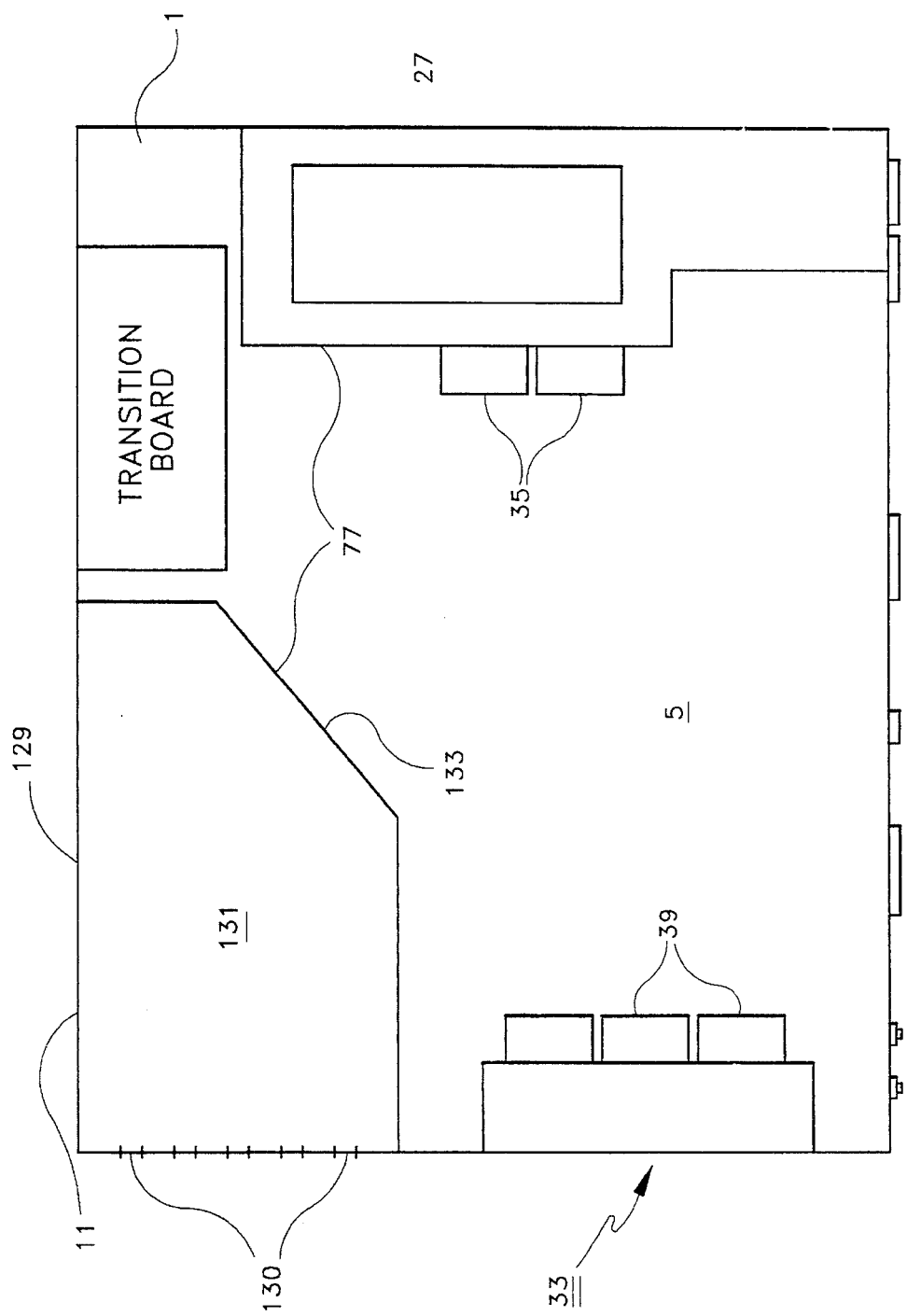
FIG. 3 is a block diagram top view of another configuration of the lower bay when used in conjunction with the mass storage unit.

As shown in FIGS. 3 and 4, short, lightweight partitions 77, of metal or plastic, may be conveniently used to direct the flow of cooling air around specific accessories located in lower bay 23. As shown in FIG. 3, partition 77 may be used to isolate a portion of lower bay 23 so that no accessory is positioned therein—such as when a mass storage unit will be mated with rack 1, as will be hereinafter more fully explained. As shown in FIG. 4, partition 77 may be used to isolate a highly radiation producing power supply and, at the same time, concentrate a flow of cooling air to pass over the entire power supply as shown by the arrows in the drawing.

In many cases it is desirable to match the air flow openings in support plate 21 with specific air inlet ports formed in the covering of the encapsulated computer. This invention contemplates matching the openings in support plate 21 with the normal inlet ports in the bottom cover of computer 3 so as to allow restriction-free transfer of cooling from cooling fans 39 into the enclosure of the computer encapsulated in upper bay 25. The use of high velocity ram air fans also provides a slight positive pressure in upper bay 25 to enhance cooling capacity and reduce the influx of dust, dirt particles, and smoke.

In some cases it is necessary to set the encapsulated computer midway between support plate 21 and top plate 17 as well as centering it in upper bay 25. Most computers come with their own set of support legs, be it rubber pads or an "out dent" formed in the bottom cover of the computer at or near the corners thereof. In most cases the computer is already set above the surface on which it rests to allow for a flow of cooling air under the unit and, in some cases, into the unit through apertures formed in the bottom of the cover. This invention contemplates insuring a separation between support plate 21 and the bottom of the computer cover to allow for passage of air in through openings in support plate 21 and around the bottom and up the side walls of the computer. This is accomplished using isolastic pads 88 at the corners of the computer.

These isolastic pads 88 provide unique benefits to this invention when used in combination with rack 1. First, they provide a slight separation between the computer and the SRU to prevent metal-to-metal conduction of heat from the lower bay to the SRU enclosure and the computer. In addition, the pads provide shock isolation between the computer and rack 1. Further, pads 88 provide traction to the computer to prevent sliding on support plate 21.

As shown in FIGS. 2b and 17, SCSI connectors are provided in rack rear wall 13 that can be used to interconnect computer 3 with accessories located in lower bay 23 and with other external units such as a printer. AC power inlet and outlet connections are also provided along with typical serial and parallel ports and keyboard connections. In this invention, we have found it desirable to remote the standard rear wall mounted keyboard connection to front wall 11, as shown in FIG. 2a, to provide for greater ease of use. Retaining the keyboard connection at its typical rear panel position places a forward bias on the rack because of the spiral-wound keyboard cable being drawn toward the front of the unit. This bias causes rack 1 to roll forward on rails 49 and pull the unit out of alignment in the EIA rack. By remotely locating the keyboard connector to chassis front wall 11, the bias is eliminated and the unit will stay in place.

The same reasoning is applied to the off/on power switch. In its typical location at the rear of the computer places a strain on the user to pull the unit forward on rails 49 in order to reach behind rack 1 to turn the unit on or off. By remoting this switch to the front panel 11, this wasteful effort is eliminated and the unit is allowed to remain in its operative position.

A unique fascia door assembly 79 is provided over chassis front wall 11. It is unique in that it can be used against front wall 11 or removed and relocated to the front wall of the mass storage unit hereinafter described. Also, it has some attributes not found in other computers. As shown in FIG. 5, fascia door assembly 79 comprises a door frame 81 that includes elongated top and bottom brackets 83a and 83b and shorter side brackets 85a and 85b assembled together and attached about the perimeter of front wall 11 to support the fascia. Side brackets 85a and 85b have graspable handle portions 87a and 87b formed or molded therein for ease in pulling and pushing rack 1 along slide rails 49.

A molded door panel 89 is provided that is defined by mutually spaced-apart, elongated top and bottom edges 91a and 91b and shorter side edges 93a and 93b of a size and shape to fit closely against brackets 83a, 83b, 85a and 85b of the door frame. Door panel 89 is transparent and may be arranged to pivot along any edge, for opening and closing; shown in FIG. 5 is a bottom pivoted door arrangement which is the preferred embodiment. In this configuration, a pair of pins 92 extend outward from the lower part of door side edges 93a and 93b that are captured in complimentary slots 95a and 95b to allow the door to be pivoted downward to open and upward to close. As shown in FIG. 5, door panel 89 is slightly convex in shape. To prevent jamming of the lower most door panel in a stack of chassis, slots 95a and 95b are conveniently formed as "L" shaped slots with one slot portion extending forward, out of front wall 11. In this configuration, door panel 89 can be lifted slightly in the vertical portion of the "L" slot to prevent interference with a lower surface or pulled outward through the horizontal portion of the "L" slot to remove the door panel altogether from rack 1.

Figure 6:
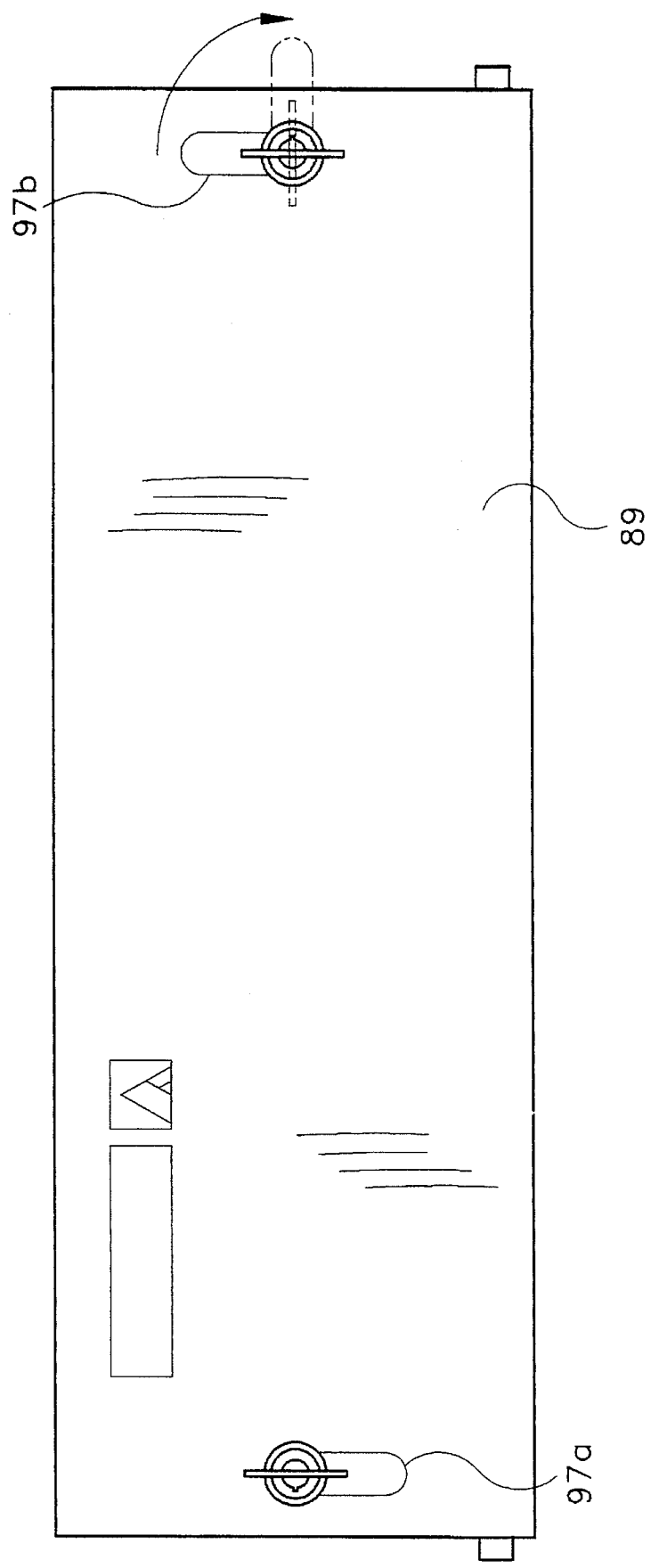
FIG. 6 is an illustrative view of the chassis with a front facia door with its locking/unlocking hardware.
Figure 15:
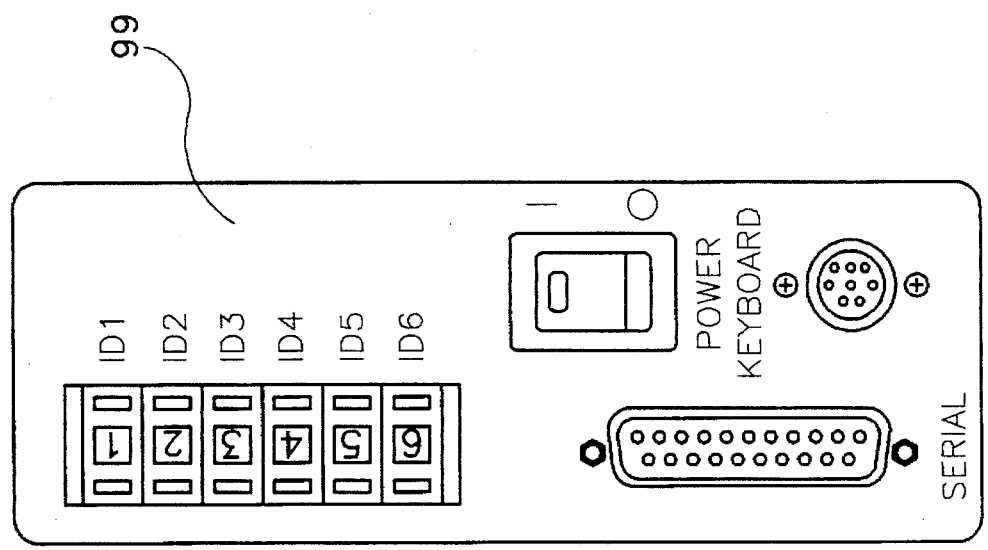
FIG. 15 is an illustrative view of a panel mounted in the frame of the front fascia door showing certain switches and plugs remoted from their typical location at the rear of the computer.
Figure 16A:
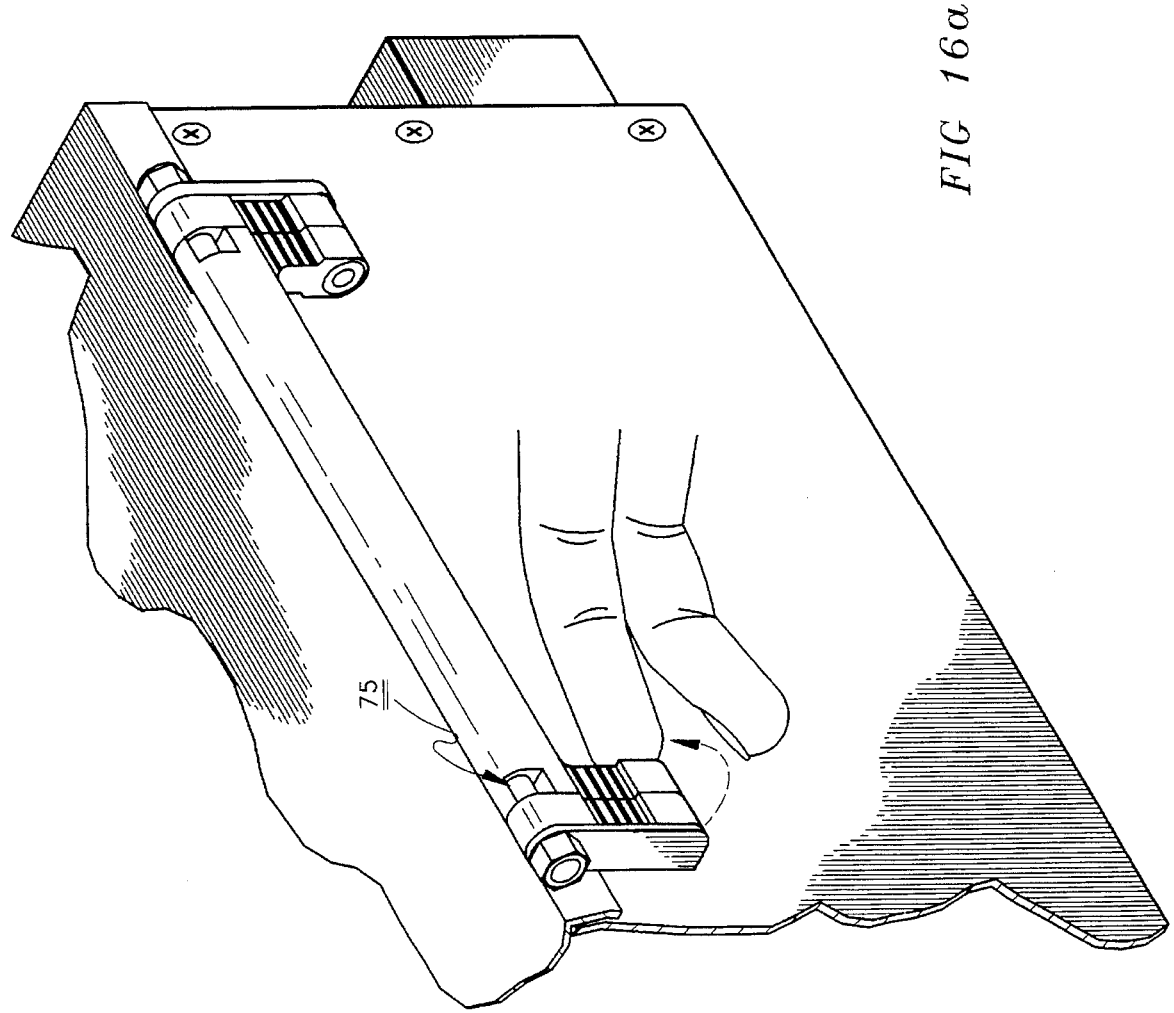
Figure 16C:
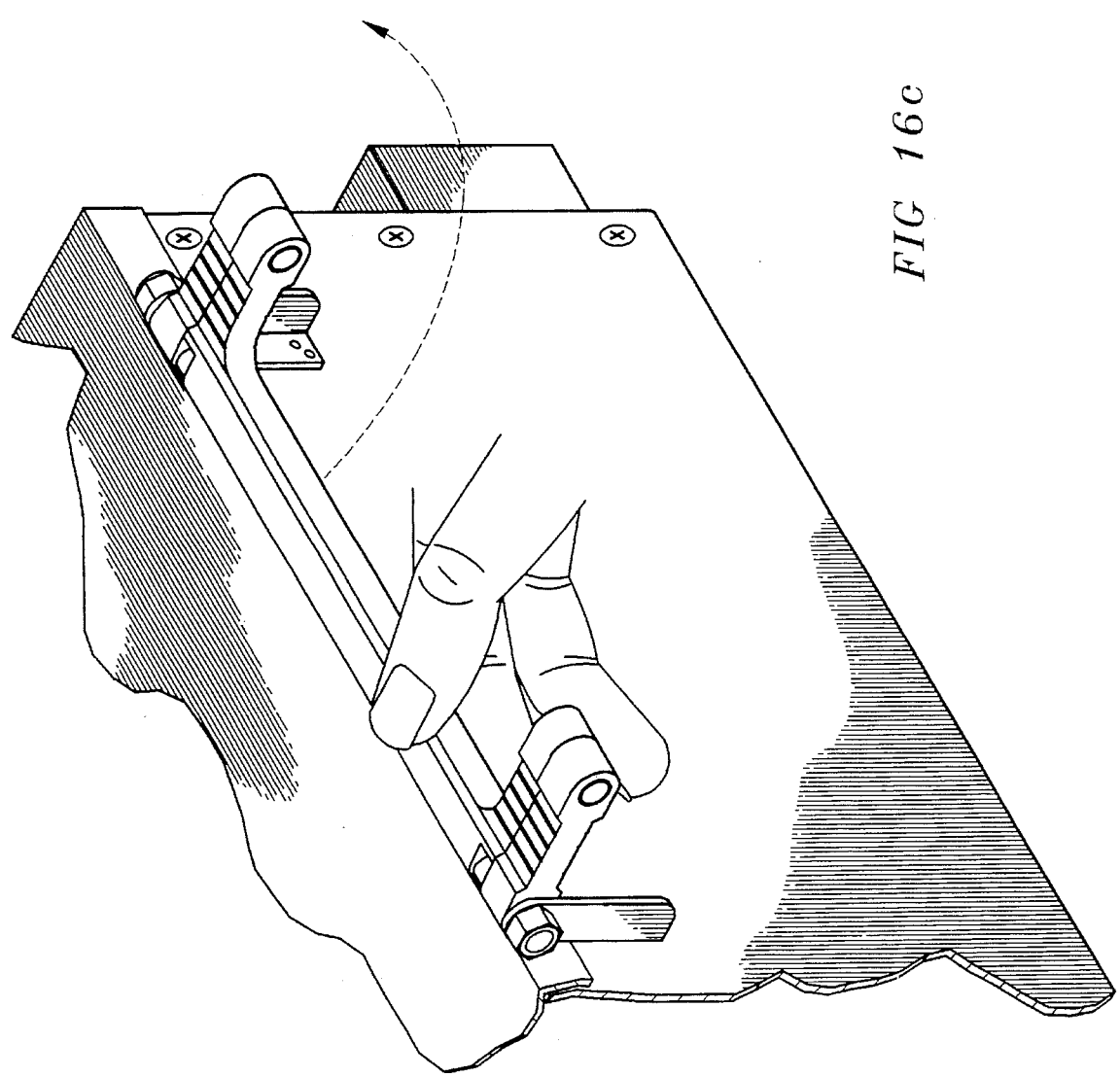
Figure 16D:
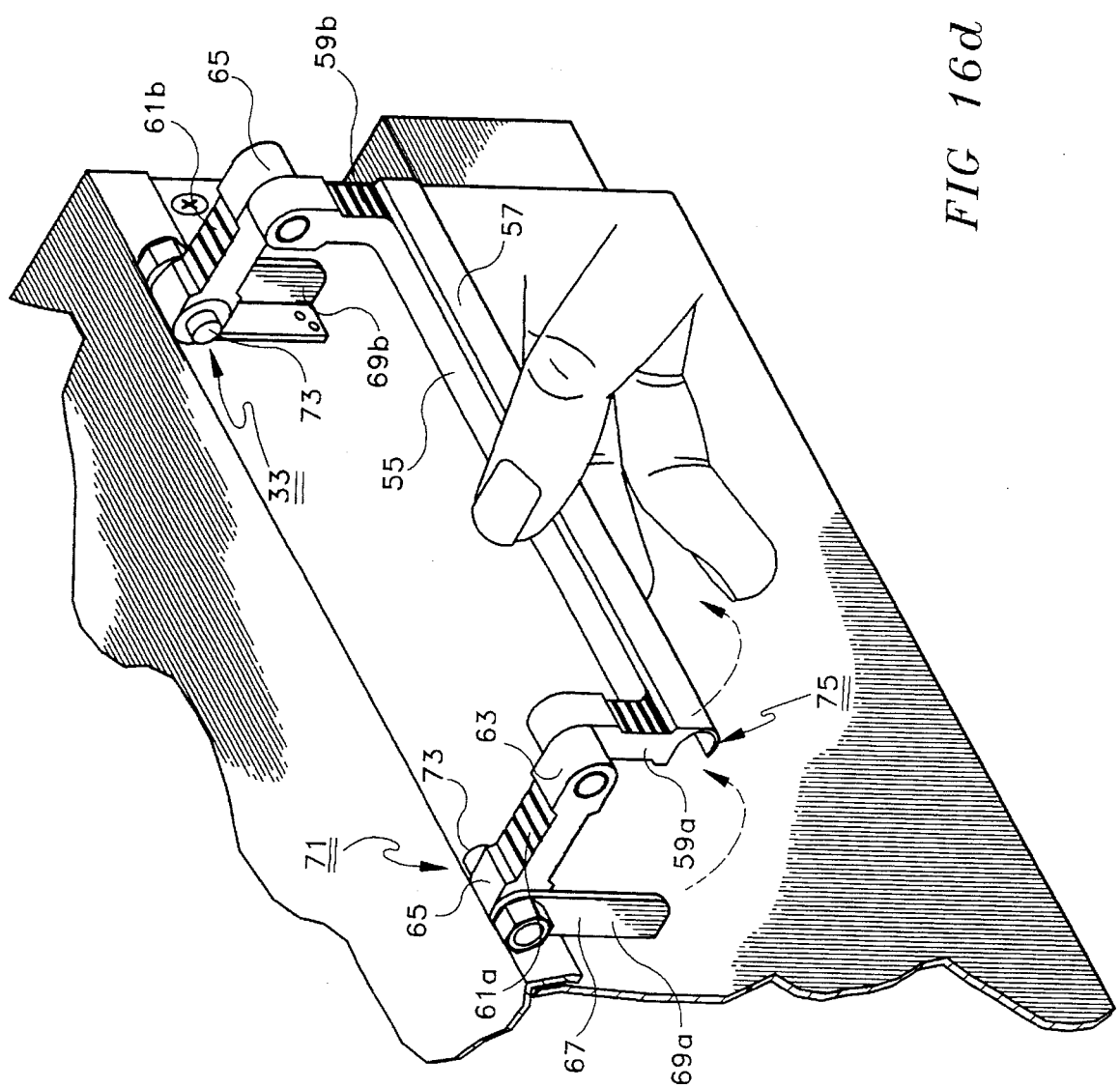

As shown in FIG. 6, at least one, but preferably a pair of spaced-apart turnable locking tabs 97a and 97b are provided for rotation by hand or key into complimentary slots formed in side brackets 85a and 85b to lock and/or hold door panel 89 in closed position against front wall 11. As shown in FIGS. 5, 7 and 15, a small panel 99 is mounted within door frame 81, behind door panel 89, wherein is located the computer (and accessory) main off/on power switch and computer keyboard connector that were remoted from the rear of computer 3 as previously described. Other switches or connectors may also be located in this panel.

As shown in FIGS. 8 through 14, this invention also includes a mass storage enclosure 101 for joining together a plurality of computer accessories, such as additional disk drives and DAT units, in close proximity for ease of use along with the encapsulated computer and its added-on accessories located in both bays of rack 1. Enclosure 101 is conveniently attachable to the front wall of rack 1 and detached at will. Accordingly, we have adopted the term "Removable Rackmounted Unit" or "RRU" to this enclosure. Thus, the SRU and the RRU may be utilized together or separately. Both units are adaptable to the EIA configuration.

RRU 101 comprises mutually spaced-apart top and bottom walls 103, side walls 105 and front and rear walls 113 and 115 respectively that define an enclosed housing 117 of a size and shape to fit conveniently with rack 1 into said EIA configured rack. Handles 53 are attached to side walls 105, for lifting the RRU, and holes are provided in the same walls for inserting machine screws to fasten the RRU to brackets 45 and side rails 49 so that it may be physically mated to the front of rack 1. One or more large SCSI multipin plugs 119 are located on rear wall 115 for connection with a like plug in chassis front wall 11 to electronically link the SRU and RRU together.

A plurality of separate bays 121 are formed in mass storage enclosure 101 for receipt of separate mass storage units such as disk and floppy disk drives. In the preferred embodiment shown in FIG. 8 there are six separate bays plus a power supply for all the units. The preferred embodiment of the RRU is shown in FIG. 9a showing the drives in side-by-side arrangement in close configuration and a power supply located at one side.

One would initially think that the close proximity of the drive units would cause overheating to occur within the enclosure. However, the close proximity of the devices, coupled with the unique cooling system is what insures the units run cool. The floor plan of the inserted drive units and other resident accessories are shown in FIG. 9a; the rear wall configuration is shown in FIG. 9b.

A separate entrance 123 is provided for each bay 121 so that the mass storage units remain separate, in side-by-side arrangement while positioned therein. Each entrance 123 is closed over by a separate door 125 that is preferably pivotally mounted at the top thereof and biased by spring action (not shown) into closed position inside said bay and over said entrance. Upon inserting a mass storage device into a bay, door 125 is caused to be pivoted inward against the respective nearest wall, in this case the top wall, and out of the way.

Figure 9A:
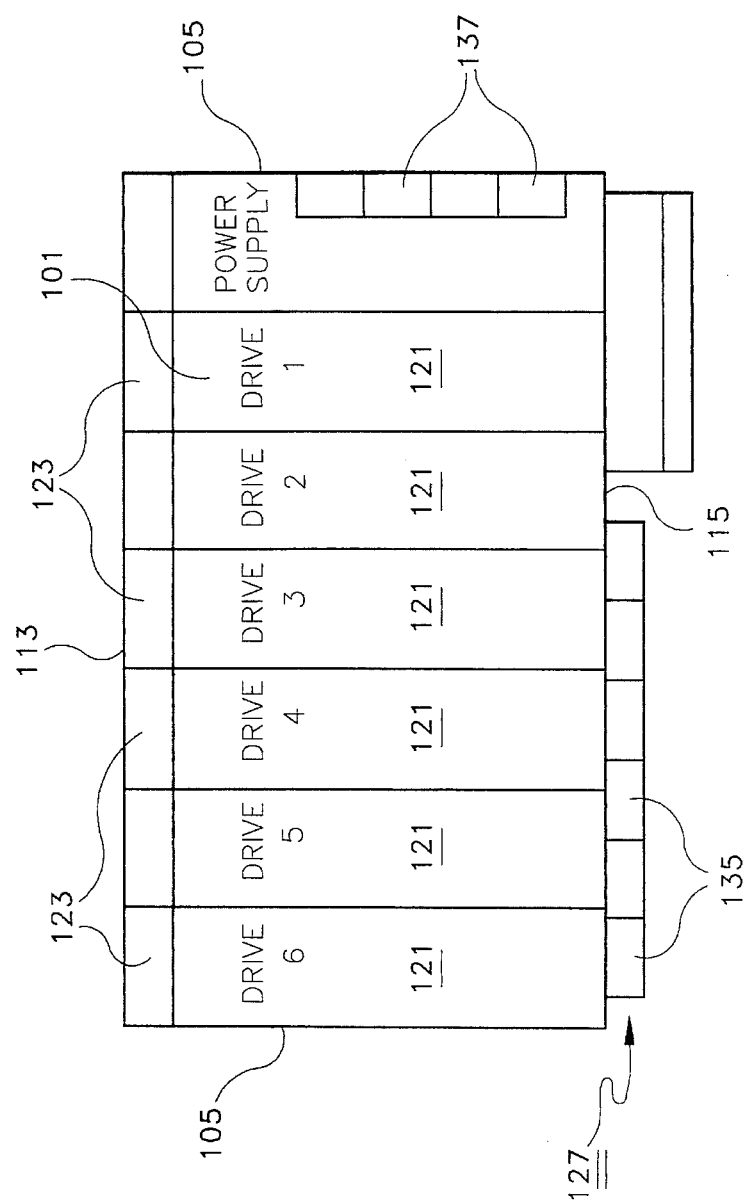
FIG. 9a is a top view of the mass storage unit with the top wall removed, showing the internal arrangements of the components therein.
Figure 9B:
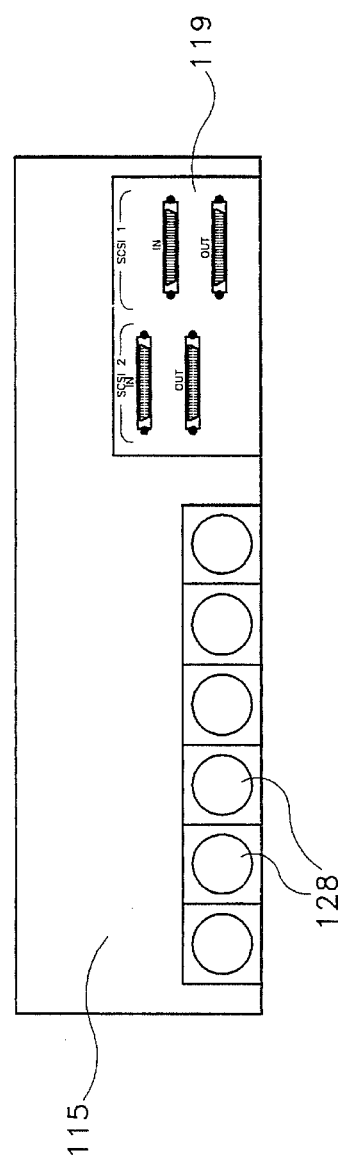
FIG. 9b is a rear view of the rear wall of the enclosure.
Figure 10B:
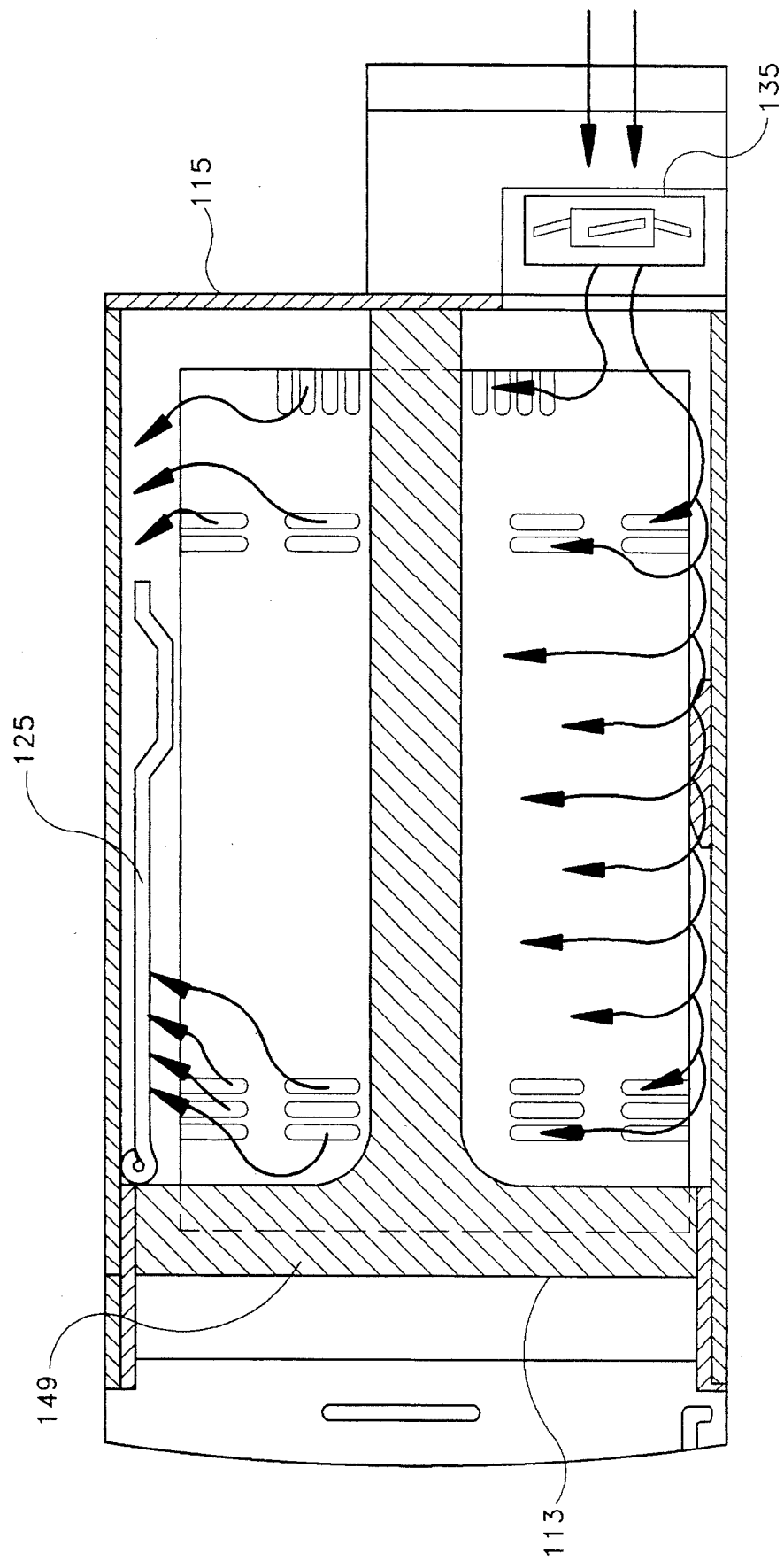
FIG. 10b is a right side view showing more of the flow.
Figure 10C:
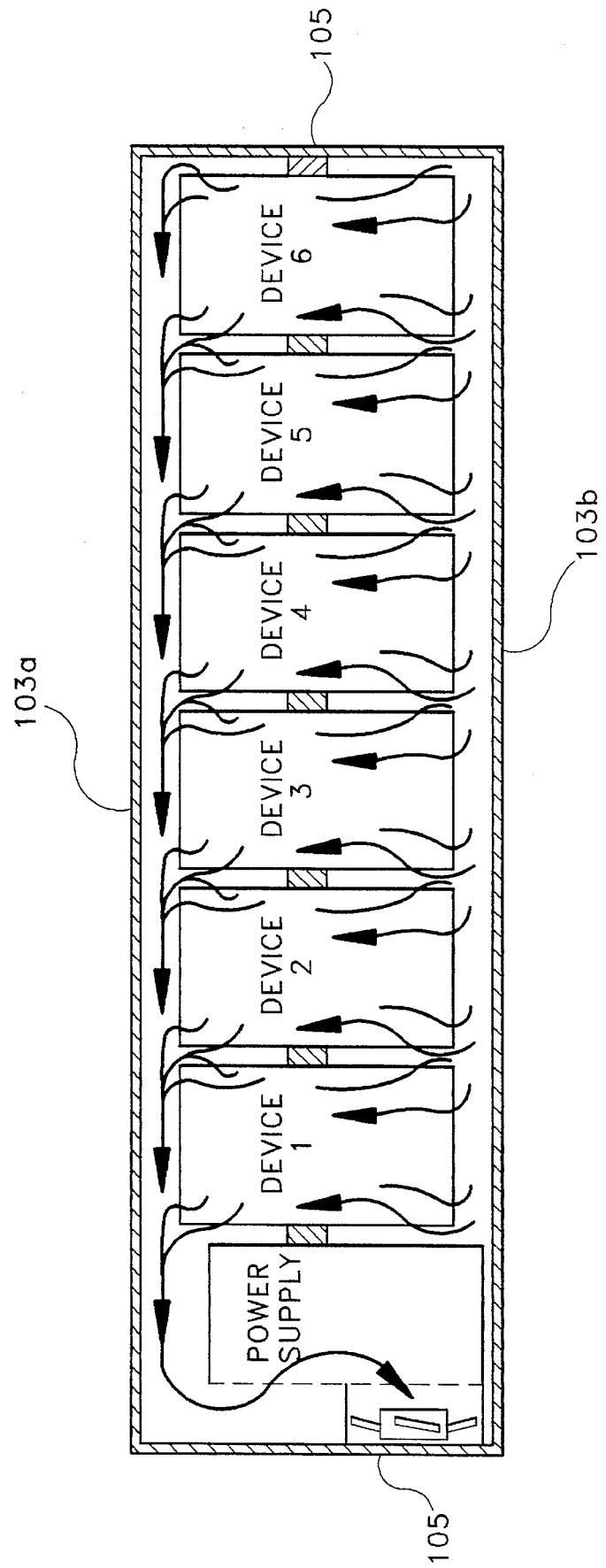
FIG. 10c is a front view showing additional air flow.

As shown in FIGS. 9a and 9b, ram air means 127 is provided to direct cooling air, under pressure, through enclosure 101 and around mass storage units inserted therein as well as the power supply. The configuration shown in FIGS. 9a and 9b are compatible with the configuration shown in FIG. 3 in that the cooling ram air fans protruding from the back wall of FIG. 9a are insertable in the entranceway 129 formed in lower bay 23. A series of vertical slots 130 allows large amounts of cooling air to be brought into lower bay 23, through plenum 131 formed by partition 133 and into fans 135 located at the rear of enclosure 101. FIG. 10 shows the flow of air from inlet fans 135, across the volume defined therein, and out exhaust fans 137.

A plurality of open channels 139 are formed interior the cover walls of enclosure 101 and between the inserted devices for the purpose of insuring the inserted devices remain in separate and defined position and further insuring the air flow inside the enclosure remains restriction-free. These channels are formed by a bottom rail 147, that spans bottom wall 103b and lies under bays 121, and separate side rails 149 that extend fore to aft between each bay. A special detent 151 is formed by spaced-apart pairs of lateral folds 153 made in doors 125 (see FIG. 18) to insure a restriction-free air channel above the inserted units when a door is fully opened.

Figure 12:
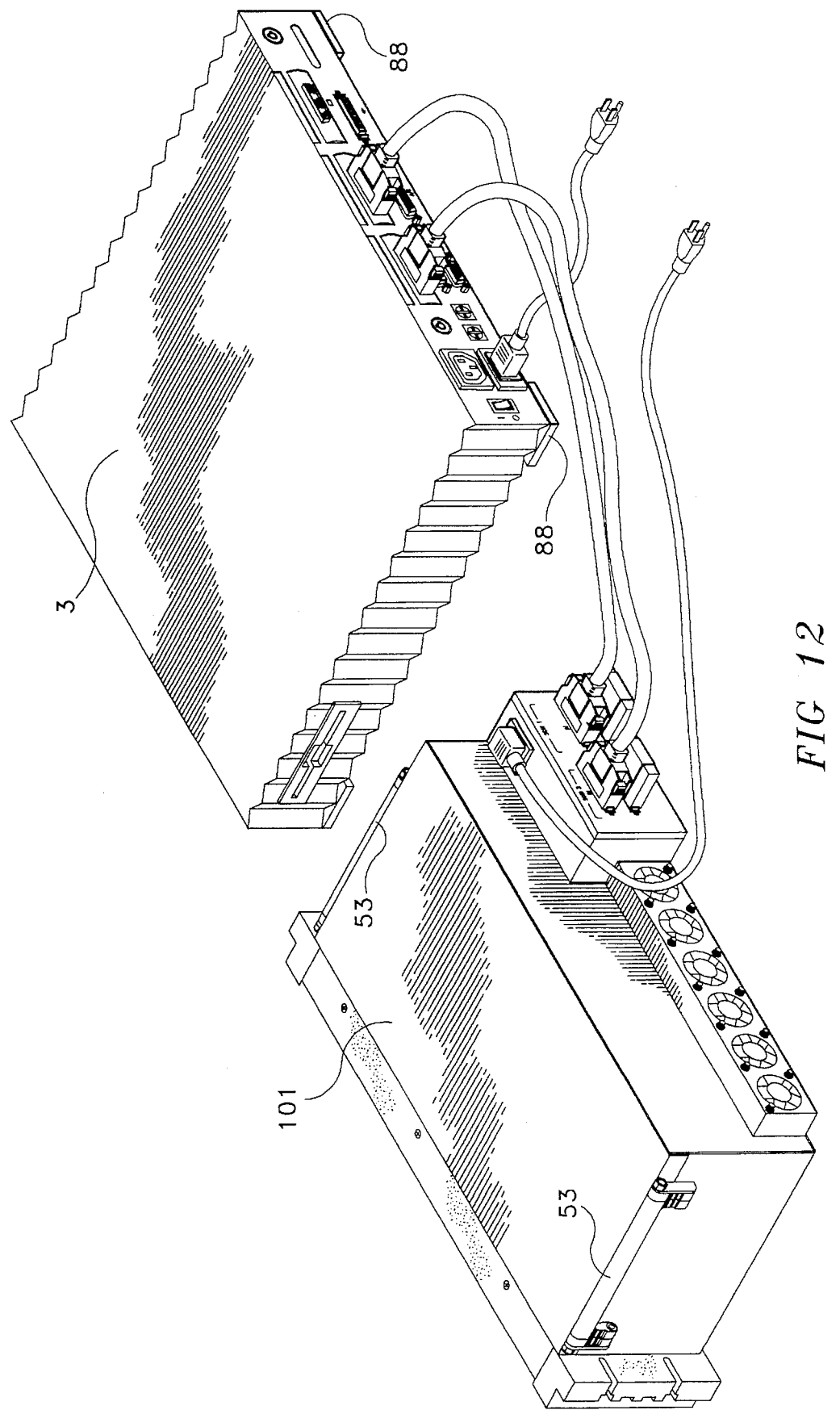
FIG. 12 is a typical view of a mass storage enclosure assembled beside the chassis and interconnected the computer encapsulated therein.
Figure 13:
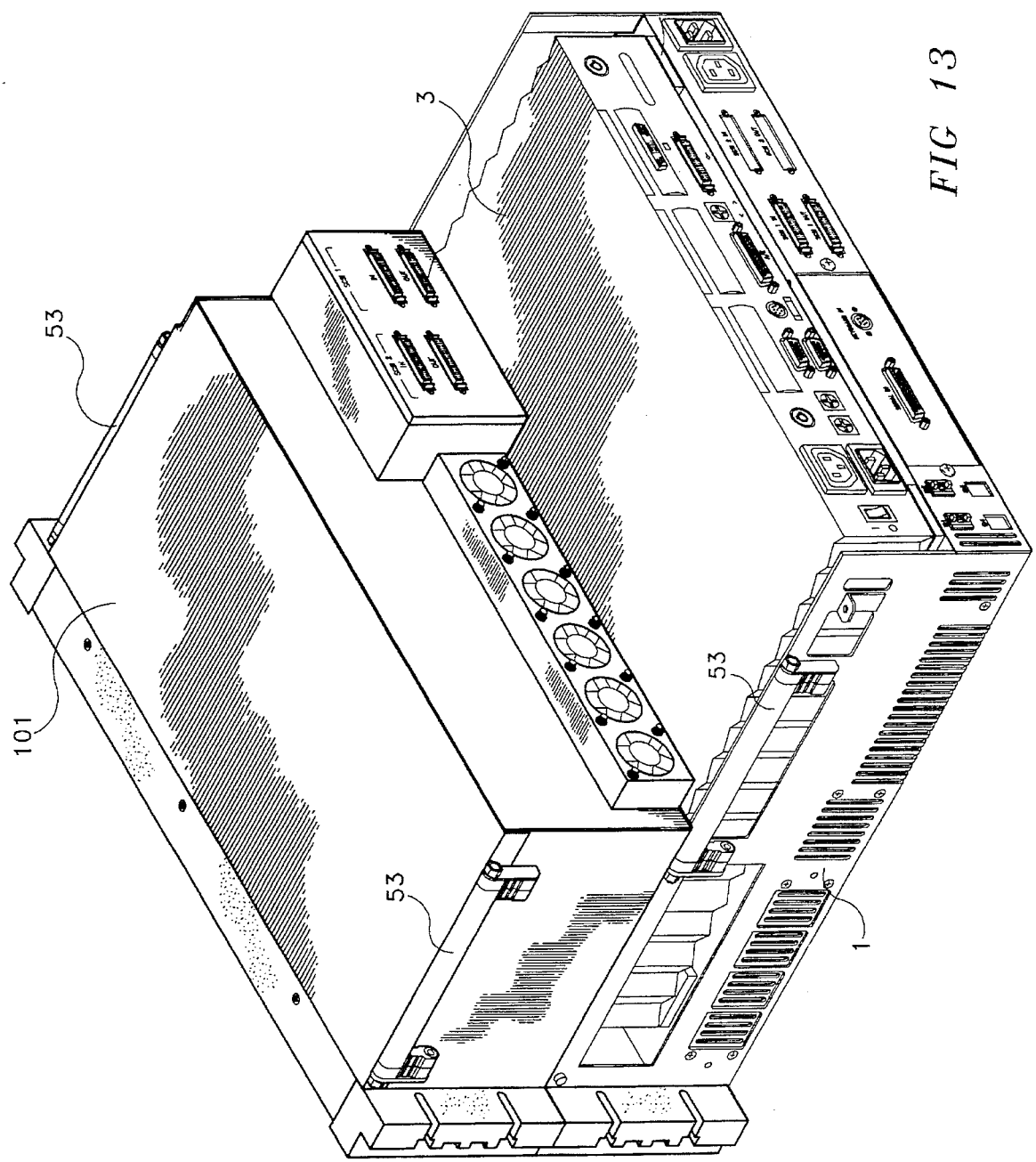
FIG. 13 is a typical view of a mass storage enclosure assembled atop the chassis and interconnected the computer encapsulated therein.

As shown in FIGS. 9a and 9b, more intake fans 135 are provided in enclosure 101 than outlet fans 137. The purpose of this is to create a positive pressure in enclosure 101 to maximize cooling air flow rates, bar against the influx of dust into the enclosure, and to insure doors 125 remain closed against the inside of entrances 123. The same brackets 47 and slide rails 49, as are used to mount rack 1, may be employed to lift, transport, and support the RRU in the EIA enclosure previously discussed. Further, facia door assembly 79, with its small panel 99 carrying the off/on power switch and the keyboard connector, may be attached to enclosure front wall 113; this is shown in FIGS. 10 to 12.

Figure 14:
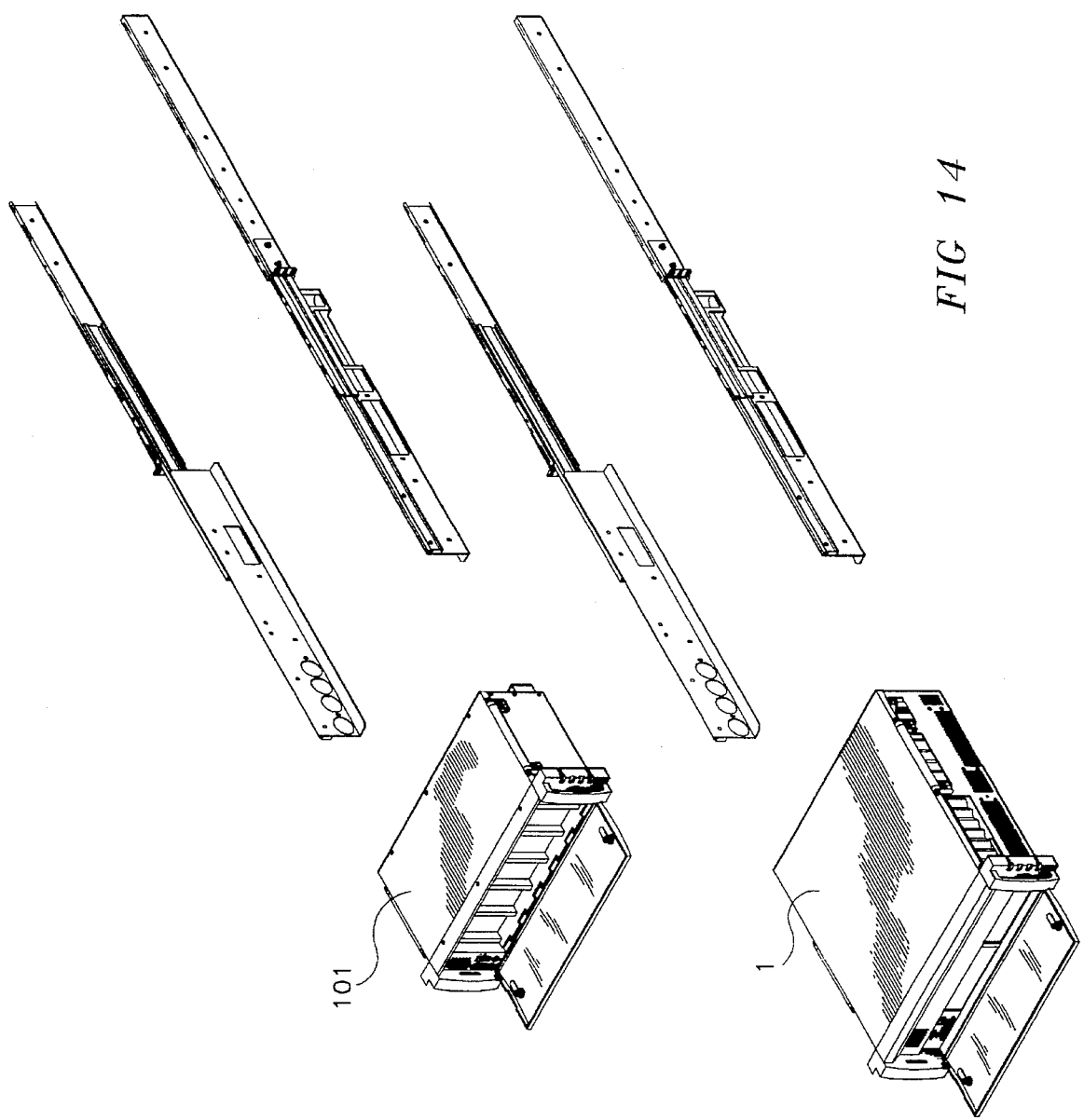
FIG. 14 is a typical view of a mass storage enclosure positioned in a EIA rack above the chassis that is independently positioned in the same EIA rack.

As shown in FIGS. 11 to 14, the versatile mass storage enclosure 101 may be attached to the front wall of rack 1 and used in the EIA configuration as an elongated combination (FIG. 11) or used independently as a side-by-side unit (FIG. 12), or stacked on top of rack 1 (FIG. 13), or positioned independently as a separate EIA unit above the chassis (FIG. 14). In these latter configurations the units may be interconnected using the short cables and SCSI connectors as shown in FIG. 17. Handles 53 are also attached to enclosure 101 for lifting and supporting the unit.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the way to achieve substantially the same result are within the scope of this invention.

What is claimed is:

1. A rack for encapsulating a standard desk-top mounted, air-cooled electronic computer for juxtaposed mating with computer accessories in an EIA-configuration comprising:
   a) a base plate defined by spaced-apart side walls and spaced-apart front and rear walls, said walls extending upward therefrom to a common contiguous upper edge enclosed by a top plate to create an EIA-sized enclosure;
   b) a support plate bounded by said walls and located intermediate said base plate and said top plate to divide said enclosure into a lower bay and a separate upper bay, said upper bay of a size and shape to encapsulate the computer therein and said lower bay of a size to receive a power supply and other accessories for interfacing with the computer;
   c) ram air cooling means located in said lower bay for providing a first stream of cooling air for cooling the accessories and power supply in said lower bay and then for passing upward, inside said rack, into said upper bay to provide additional cooling for the computer encapsulated therein in addition to the cooling that is being done by its own internal cooling system;
   d) rails mounted on said side walls for supporting said rack; and,
   e) handles mounted on said side walls for lifting said rack.

2. The rack of claim 1 wherein said base plate, said side walls and said front and rear walls form a rectangular enclosure.

3. The rack of claim 1 wherein said base plate, said support plate, said side walls and said front and rear walls form a square periphery.

4. The rack of claim 1 further including partitions in said lower bay for isolating the flow of cooling air, drawn thereinto by said ram air cooling fan means, to specific pathways to provide efficient cooling to the power supply and accessories located therein.

5. The rack of claim 1 wherein said side walls have formed therein a plurality of slotted apertures above said support plate for matching with apertures formed in the side walls of the computer to allow the passage of more cooling air therethrough.

6. The rack of claim 1 wherein said support plate is positioned below said upper wall edge a distance sufficient to allow the computer to fit wholly within said upper bay and below said upper wall edge.

7. The rack of claim 1 further including SCSI connectors located in said rear wall.

8. The rack of claim 1 further including a fascia door for closing over said front wall, said door including:
   a) a door frame comprising spaced-apart, elongated top and bottom brackets and spaced-apart, shorter side brackets assembled together and attached about the perimeter of said front wall;
   b) a door panel defined by spaced-apart, elongated top and bottom edges and shorter, spaced-apart side edges, and of a size and shape to fit closely within said side brackets and adjacent said top and bottom brackets over said front wall;
   c) a pair of pins extending between said door panel side edges and said side brackets to allow said door panel to pivot between a closed position adjacent said front wall and an open position apart therefrom.

9. The fascia door of claim 8 further including a panel within said door frame having mounted thereon a switch to turn the computer on and off.

10. The fascia door of claim 8 further including lock and release means interfitted said door panel and said door frame for fastening said door panel against said front wall.

11. The fascia door of claim 10 further including pivotable tabs mounted on said door panel and arranged to move into and out of reception with complimentary slots formed in said door frame.

12. The fascia door of claim 11 wherein said pivotable tabs are lockable and unlockable.

13. The fascia door of claim 8 further including slots formed in said side brackets allowing said fascia door panel to be pulled free of said front wall.

14. The rack of claim 1 wherein said handles are self-capturing articulating chest-type handles, each comprising:
   a) a handle bar of terminal length containing a hand-grasping portion;
   b) a pair of legs extending downward from the terminal ends of said handle bar;
   c) a pair of links, defined by spaced-apart, first and second ends, pivotally attached at said first ends to the terminal ends of said legs, outboard thereof, to allow said handle to be swung thereabout;
   d) a bracket for mounting against a vertical surface including a pair of mutually spaced-apart ears extending outward therefrom;
   e) first means for pivotally interconnecting said second link ends to said ears and including an extended element located inboard from said connection interior said links; and,
   f) second means formed in said handle bar for fastenable receipt therein of said extended element when said handle is swung downward from a carrying position and rotated about said links into overlapping arrangement therewith and said legs and links swung further downward against the vertical surface.

15. The rack of claim 1 wherein said handles are self-capturing articulating chest-type handles, comprising:
   a) a handle bar of terminal length, containing a hand-grasping portion centrally thereof, where both are straight and axially aligned;
   b) a pair of straight legs extending downward from the terminal ends of said handle bar;
   c) a pair of links, defined by spaced-apart, first and second ends, of a length when folded into overlapping arrangement with said legs, are the same length as said legs, pivotally attached at said first ends to the terminal ends of said legs, outboard thereof, to allow said handle to be swung thereabout;
   d) a pair of sub-brackets, arranged in mutual, spaced-apart position for mounting against a vertical surface, including a pair of mutually spaced-apart ears extending outward therefrom, and further including a side wall formed on each sub-bracket and extending outward and downward from said ears to cover said link in its folded configuration;
   e) first means for pivotally interconnecting said second link ends to said ears and including an extended element located inboard from said connection interior said links wherein said extended element is rounded; and,
   f) second means formed in said handle bar for fastenable receipt therein of said extended element when said handle is swung downward from a carrying position and rotated about said links into overlapping arrangement therewith and said legs and links swung further downward against the vertical surface, and said cavity means includes a rounded cavity of the size and shape of said element and further including a lip, formed on said handle adjacent said cavity means, extending over the top of said cavity means to aid in the capture of said handle in its closed configuration.

16. The rack of claim 1 further including a mass storage enclosure for attachment to said rack front wall, said enclosure including:
   a) mutually spaced-apart top and bottom walls, side walls and front and rear walls that define an enclosed housing of a size and shape to fit into said EIA configured rack;
   b) means formed in said housing side and rear walls to electronically and physically mate said enclosure with said front wall of said rack;
   c) a plurality of separate bays formed in said housing for receipt therein of separate mass storage units;
   d) a separate entrance formed in said front wall of said housing for each said bay throughwhich said mass storage unit may be passed;
   e) a door pivotally mounted over each entrance and biased in closed position over each empty bay, moveable to an open position upon passage therethrough of a mass storage drive unit into said bay;
   f) ram air means in said housing, including intake fan and exhaust fan means for passing large amounts of cooling air throughout said housing and the drive units in said bays; and,
   g) a plurality of open channels formed on the inside surfaces of said housing walls to distribute cooling air over the outer surfaces of each drive unit inserted therein.

17. The storage enclosure of claim 16 further including brackets and rails operably mounted on said housing side walls for supporting said housing in said rack.

18. The storage enclosure of claim 16 further including handles mounted on said housing side walls for lifting said housing.

19. The storage enclosure of claim 16 wherein said means formed in said housing side and rear walls to electronically and physically mate said enclosure with said front wall of said rack include at least one short cable for connection to another mateable SCSI interface connector and brackets interconnectable with said side walls of said housing and said rails to operably support said enclosure therein.

20. The rack of claim 16 further including:
   a) a cooling air passageway defined by an air inlet opening in said side wall of said lower bay and an air outlet opening in said front wall of said lower bay;
   b) said air outlet arranged to mate with said ram air intake fans in said housing; and,
   c) air directional barriers formed in said channels to divide the air flow over each mass storage device inserted therein.

21. The rack of claim 20 further including a plurality of intake fans and a plurality of exhaust fans, wherein said plurality of intake fans exceeds said plurality of exhaust fans to generate a positive air pressure inside said enclosure.

22. The rack of claim 16 further including a lateral detent formed in each said bay door forming a cooling air channel across a surface of a mass storage unit inserted therein when swung away from said bar door entranceway and against an interior surface of a wall of said housing.

23. A mass storage enclosure including:
 a) mutually spaced-apart top and bottom walls, side walls, and front and rear walls that define an enclosed housing;
 b) a plurality of separate bays formed in said housing for receipt therein of separate mass storage units;
 c) a separate entrance formed in said front wall of said housing for each said bay throughwhich said mass storage unit may be passed;
 d) a door pivotally mounted over each said entrance and biased in closed position over each empty bay, moveable to an open position upon insertion of a mass storage drive unit into said bay;
 e) ram air means in said housing, including intake fan and exhaust fan means for passing large amounts of cooling air throughout said housing; and,
 f) a plurality of channels formed on the inside surfaces of said housing walls to distribute the cooling air over the outer surfaces of each drive unit inserted therein.

24. The storage enclosure of claim 23 further including handles mounted on said side walls for lifting said housing.

25. The storage enclosure of claim 24 further including:
 a) a cooling air passageway defined by an air inlet opening in said side wall of said lower bay and an air outlet opening in said front wall of said lower bay;
 b) said air outlet arranged to mate with said ram air intake fans in said housing; and,
 c) air directional barriers formed in said channels to divide the surfaces of each mass storage device inserted therein.

26. The storage enclosure of claim 23 further including a plurality of intake fans and a plurality of exhaust fans, wherein the plurality of intake fans exceeds the plurality of exhaust fans to generate a positive air pressure inside said enclosure.

27. The storage enclosure of claim 23 further including a lateral detent formed in each said bay door for forming part of a cooling air channel across a surface of a mass storage unit inserted therein when swung away from said door entrance and against an interior surface of a wall of said housing.

28. The storage enclosure of claim 23 further including a fascia door for closing over said front wall, said door including:
 a) a door frame comprising spaced-apart, elongated top and bottom brackets and spaced-apart, shorter side brackets assembled together and attached about the perimeter of said front wall;
 b) a door panel defined by spaced-apart, elongated top and bottom edges and shorter, spaced-apart side edges, and of a size and shape to fit closely within said side brackets and adjacent said top and bottom brackets over said front wall;
 c) a pair of pins extending between said door panel side edges and said side brackets to allow said door panel to pivot between a closed position adjacent said front wall and an open position apart therefrom.

29. The storage enclosure of claim 23 further including a panel within said door frame and having mounted thereon an off-on computer power switch.

30. The storage enclosure of claim 28 further including lock and release means interfitted said door panel and said door frame for fastening said door panel against said front wall.

31. The storage enclosure of claim 30 further including pivotable tabs mounted on said door panel and arranged to move into and out of reception with complimentary slots formed in said door frame.

32. The storage enclosure of claim 31 wherein said pivotable tabs are lockable and unlockable.

33. The storage enclosure of claim 28 further including L-shaped slots formed in said side brackets allowing said fascia door panel to be pulled free of said front wall.

* * * * *